US012591335B2

(12) United States Patent
Lee et al.

(10) Patent No.: US 12,591,335 B2
(45) Date of Patent: *Mar. 31, 2026

(54) SYSTEM AND METHOD FOR DIFFERENTIAL PARALLEL TOUCH SENSING

(71) Applicant: Synaptics Incorporated, San Jose, CA (US)

(72) Inventors: Sung-Sool Lee, Gangnam-gu (KR); Guozhong Shen, Fremont, CA (US); Yoonhong Kim, Gangnam-gu (KR); Tom Vandermeijden, San Jose, CA (US); Ching-Hsung Wang, Santa Clara, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/040,492

(22) Filed: Jan. 29, 2025

(65) Prior Publication Data

US 2025/0173022 A1      May 29, 2025

Related U.S. Application Data

(63) Continuation-in-part of application No. 18/643,808, filed on Apr. 23, 2024, now Pat. No. 12,333,112.
(Continued)

(51) Int. Cl.
*G06F 3/041*          (2006.01)
*G06F 3/044*          (2006.01)

(52) U.S. Cl.
CPC .......... *G06F 3/0418* (2013.01); *G06F 3/0412* (2013.01); *G06F 3/0446* (2019.05);
(Continued)

(58) Field of Classification Search
CPC .... G06F 3/0418; G06F 3/0412; G06F 3/0446; G06F 3/0443; G06F 2203/04104; G06F 2203/04106; G06F 3/04166
See application file for complete search history.

(56) References Cited

U.S. PATENT DOCUMENTS

| | | | | |
|---|---|---|---|---|
| 10,528,200 B2 * | 1/2020 | Park | | G06F 3/0443 |
| 11,409,396 B1 * | 8/2022 | Hoch | | G06F 3/0445 |

(Continued)

FOREIGN PATENT DOCUMENTS

WO          2016209590 A1      12/2016

OTHER PUBLICATIONS

U.S. Appl. No. 18/643,808, filed Apr. 23, 2024.
International Search Report, dated Aug. 21, 2024, in International Patent Application No. PCT/US2024/027192.

*Primary Examiner* — Amy Onyekaba
(74) *Attorney, Agent, or Firm* — Leydig, Voit & Mayer, Ltd.

(57)          ABSTRACT

Systems and methods for differential parallel touch sensing are provided. An input device includes a display with an integrated touch sensor. The touch sensor includes a plurality of sets of sensor electrodes. Each set of sensor electrodes has a positive transmitter electrode, a negative transmitter electrode, and a differential pair of receiver electrodes. The differential pair of receiver electrodes includes a positive receiver electrode coupled to the positive transmitter electrode and a negative receiver electrode coupled to the negative transmitter electrode. The differential pair of receiver electrodes is disposed between the positive transmitter electrode and the negative transmitter electrode. The touch sensor as includes a sensor circuit that is configured to: drive the positive transmitter electrode with a positive sensing signal, drive the negative transmitter electrode with
(Continued)

a negative sensing signal, receive resulting signals from the differential pair of receiver electrodes, and process the resulting signals.

20 Claims, 12 Drawing Sheets

Related U.S. Application Data

(60) Provisional application No. 63/465,201, filed on May 9, 2023.

(52) U.S. Cl.
CPC .. *G06F 3/0443* (2019.05); *G06F 2203/04104* (2013.01); *G06F 2203/04106* (2013.01)

(56) References Cited

U.S. PATENT DOCUMENTS

| | | | | |
|---|---|---|---|---|
| 11,972,078 | B2 * | 4/2024 | Kremin | ................... G06F 3/044 |
| 2013/0015868 | A1 | 1/2013 | Peng | |
| 2016/0291679 | A1 | 10/2016 | Jordan et al. | |
| 2018/0088706 | A1 * | 3/2018 | Tanemura | ........... G06F 3/04164 |
| 2018/0204037 | A1 * | 7/2018 | Hargreaves | ........ G06V 40/1306 |
| 2018/0253167 | A1 * | 9/2018 | Park | ....................... G06F 3/0445 |
| 2019/0179446 | A1 * | 6/2019 | Kremin | ................ G06F 3/0416 |
| 2019/0265857 | A1 * | 8/2019 | Chou | ................. G06F 3/04164 |
| 2020/0133409 | A1 * | 4/2020 | Tanemura | ............. G06F 3/0443 |
| 2020/0387248 | A1 * | 12/2020 | Kim | .................... G06F 3/04182 |
| 2021/0211129 | A1 * | 7/2021 | Muranaka | ........... G06F 3/04166 |
| 2021/0349574 | A1 * | 11/2021 | Manca | ................. G06F 3/0446 |
| 2022/0043523 | A1 * | 2/2022 | Kim | ........................ G06F 3/044 |
| 2022/0244812 | A1 * | 8/2022 | Park | .................... G09G 3/3233 |

* cited by examiner

| mm | DP0 | DP1 | DP2 | DP3 | DP4 |
|---|---|---|---|---|---|
| 1 | 8 | 62 | 129 | 130 | 76 |
| 2 | 4 | 64 | 125 | 132 | 66 |
| 3 | 4 | 66 | 127 | 145 | 64 |
| 4 | -6 | 63 | 130 | 138 | 67 |
| 5 | 2 | 65 | 128 | 132 | 64 |
| 6 | 8 | 61 | 132 | 128 | 49 |
| 7 | 12 | 55 | 133 | 123 | 23 |

700

• • •

| 32 | -1 | 44 | 20 | -10 | -2 |
|---|---|---|---|---|---|
| 33 | 0 | 48 | 8 | -6 | -2 |
| 34 | 1 | 41 | 1 | -5 | -6 |
| 35 | 5 | 34 | -2 | -7 | -5 |
| 36 | 0 | 23 | -2 | -4 | -4 |
| 37 | -3 | 10 | 2 | -5 | -5 |
| 38 | 0 | 0 | 0 | 0 | 0 |

FIG. 7

SYSTEM AND METHOD FOR DIFFERENTIAL PARALLEL TOUCH SENSING

CROSS REFERENCE TO RELATED APPLICATIONS

This application is a continuation-in-part of U.S. patent application Ser. No. 18/643,808, entitled "SYSTEM AND METHOD FOR PARALLEL TOUCH SENSING," filed on Apr. 23, 2024, which claims the benefit of U.S. Provisional Application Ser. No. 63/465,201, entitled "SYSTEM AND METHOD FOR PARALLEL SENSING IN A TOUCH SENSOR," filed on May 9, 2023, the disclosures of which are expressly incorporated by reference in their entirety.

TECHNICAL FIELD

This disclosure generally relates to touch sensors.

BACKGROUND

Input devices such as touch sensor devices (also commonly called touchpads, touch sensors, or proximity sensor devices), are used in a variety of electronic systems. Touch sensor devices typically include a sensing region, often demarked by a surface, in which the touch sensor device determines the presence, location and/or motion of one or more input objects, typically for purposes of allowing a user to provide user input to interact with the electronic system. The input device may be a touchscreen that includes a plurality of electrodes and is also capable of allowing the user to provide user input to interact with the electronic system. Foldable and rollable devices having touchscreens or other types of capacitive sensors have also been developed. Touch sensors may be integrated in a display such as, for example, commonly found in mobile phones, laptops and similar devices.

Touch sensor devices operating within an electronic system may differentiate between different types of touch events. For example, a finger touch may be interpreted as selection of a particular location on a touch screen, while a palm touch on a large area of a touch screen may be interpreted differently and activate different functionality. Detection of objects having different object sizes, particularly in the presence of noise mitigation, can be unreliable with existing solutions. Further, in some instances, the touch sensor device may move relative to another surface or material such as when placed in a pocket, water, or when a rollable phone is entirely or partially placed in an opened or closed state. Determining the portion of the touch sensor in contact with, or proximate to, such surfaces or materials may be desirable.

SUMMARY

In an exemplary embodiment, a touch sensor is provided. The touch sensor includes a plurality of sets of sensor electrodes. Each set of sensor electrodes has a positive transmitter electrode, a negative transmitter electrode, and a differential pair of receiver electrodes. The differential pair of receiver electrodes includes a positive receiver electrode coupled to the positive transmitter electrode and a negative receiver electrode coupled to the negative transmitter electrode. The differential pair of receiver electrodes is disposed between the positive transmitter electrode and the negative transmitter electrode. The touch sensor as includes a sensor circuit that is configured to: drive the positive transmitter electrode with a positive sensing signal; drive the negative transmitter electrode with a negative sensing signal; receive resulting signals from the differential pair of receiver electrodes; and process the resulting signals.

In a further exemplary embodiment, an input device is provided. The input device includes a display with an integrated touch sensor. The touch sensor includes a plurality of sets of sensor electrodes. Each set of sensor electrodes has a positive transmitter electrode, a negative transmitter electrode, and a differential pair of receiver electrodes. The differential pair of receiver electrodes includes a positive receiver electrode coupled to the positive transmitter electrode and a negative receiver electrode coupled to the negative transmitter electrode. The differential pair of receiver electrodes is disposed between the positive transmitter electrode and the negative transmitter electrode. The touch sensor as includes a sensor circuit that is configured to: drive the positive transmitter electrode with a positive sensing signal, drive the negative transmitter electrode with a negative sensing signal, receive resulting signals from the differential pair of receiver electrodes, and process the resulting signals.

In a yet a further exemplary embodiment, a method for capacitive sensing with a touch sensor is provided. The method includes driving a plurality of positive transmitter electrodes with a positive sensing signal, driving a plurality of negative transmitter electrodes with a negative sensing signal, receiving first resulting signals from a plurality of positive receiver electrodes, receiving second resulting signals from a plurality of negative receiver electrodes, and processing the first resulting signals and the second resulting signals. The plurality of positive receiver electrodes and the plurality of negative receiver electrodes form differential pairs with each differential pair having a positive receiver electrode of the plurality of positive receiver electrodes and a negative receiver electrode of the plurality of negative receiver electrodes. The positive receiver electrode is coupled to a positive transmitter electrode of the plurality of positive transmitter electrodes and the negative receiver electrode coupled to a negative transmitter electrode of the plurality of negative receiver electrodes

BRIEF DESCRIPTION OF THE DRAWINGS

FIG. 7 illustrates an example of data corresponding to differential pairs of electrodes of a touch sensor in contact with different surfaces or materials, according to one or more embodiments.

DESCRIPTION

The following detailed description is exemplary in nature and is not intended to limit the disclosure or the application and uses of the methods and systems described herein. Furthermore, there is no intention to be bound by any expressed or implied theory presented in the preceding technical field, background, summary and brief description of the drawings, or the following detailed description.

Exemplary systems and methods discussed herein provide for detecting input objects of varying sizes. In conventional approaches, mitigating noise can be difficult when detecting relatively large objects. Such problems can arise, for example, because some noise reduction techniques feedback average resulting signals into the touch sensor from a large number or even all sensing circuits (e.g., electrodes) to mitigate noise. As such, large areas of touch provide resulting signals that approximate the average signal causing the touch signal to be cancelled out or to be very small and hence difficult to measure and detect. According to exemplary embodiments, differential parallel sensing methods and systems are used to accurately and reliably detect input objects of varying sizes, including large input objects, while at the same facilitating mitigation of noise caused by various sources. In certain embodiments, sequential parallel touch sensing can be used by taking measurements over multiple time periods. The transmitter and receiver electrodes may be sequentially shifted for each time period thereby providing more resolution than would be provided without sequential shifting.

Exemplary systems and methods also provide for detecting presence of certain materials or surfaces covering, or proximate to, part or all of the touch sensor. Such methods and systems can be used, for example, to detect whether the touch sensor is placed entirely or partially in a cover, protective sleeve or pocket or in contact with a surface other than air, e.g., a liquid, and/or whether a rollable device, such as a rollable phone is in a closed, partially closed or opened state.

Figure 1:
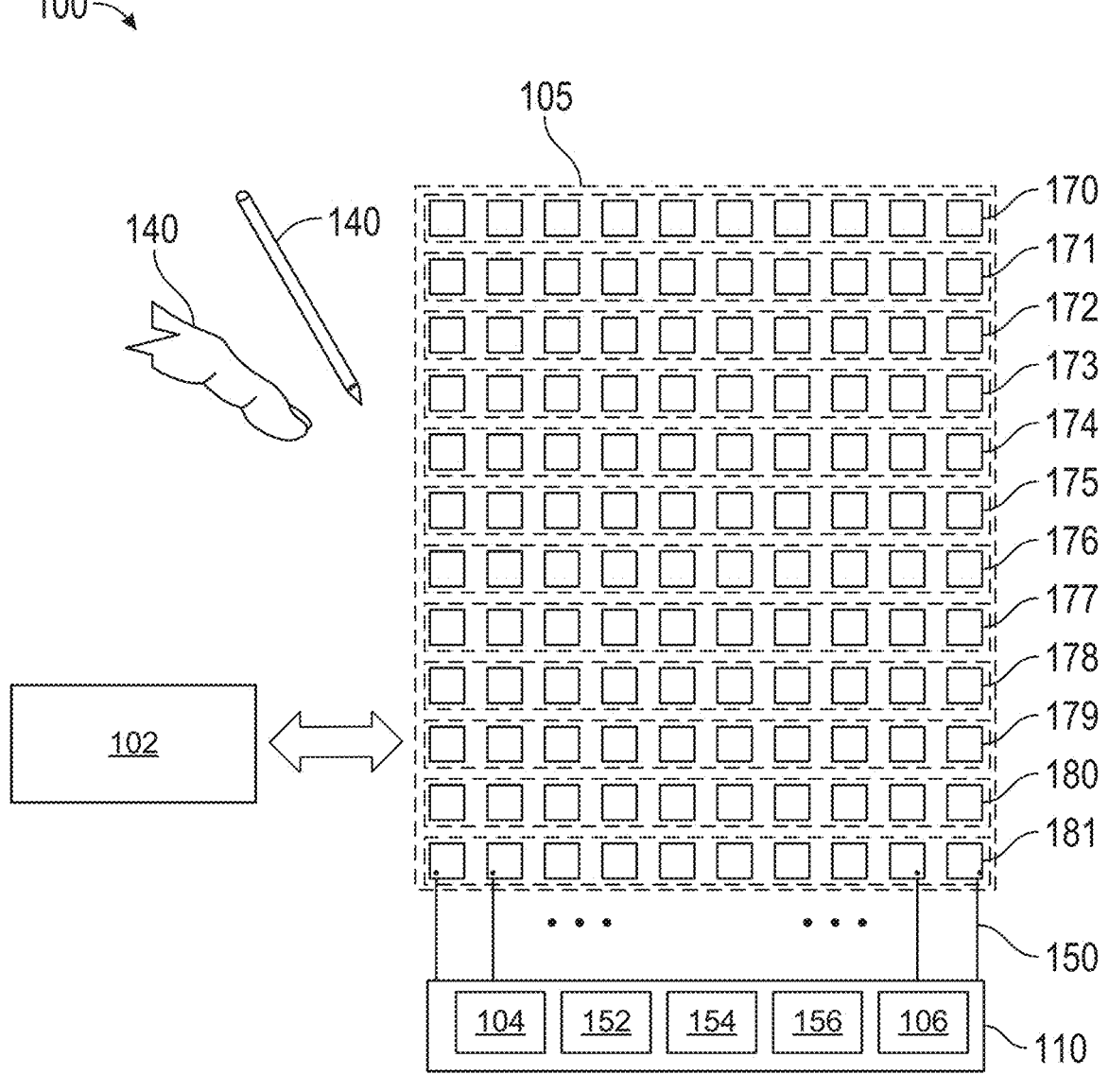
FIG. 1 is a block diagram of an input device, according to one or more embodiments.

FIG. 1 illustrates an input device 100 configured to provide input to an electronic system 102, which can be used to implement differential parallel touch sensing in at least certain modes as described herein. Some non-limiting examples of electronic systems include desktop computers, laptop computers, netbook computers, tablets, terminals, kiosks, mobile (e.g., cellular) phones including rollable and foldable phones, automotive multimedia centers and internet of things (IoT) devices, among others. The input device 100 may be part of the electronic system 102 or may be a separate component communicatively coupled to the electronic system 102.

The input device 100 includes a processing system 110 and sensor electrodes 105. The processing system 110 operates the sensor electrodes 105 to detect one or more input objects 140 or other condition in a sensing area of the input device 100. The sensor electrodes 105 form a touch sensor. Example input objects 140 include fingers and styli, as shown in FIG. 1. Input objects may include parts of a hand other than a finger, such as a palm or side of the hand. Other conditions may include contact with, or proximity of, the sensing area to surfaces or materials (e.g., air, liquid, plastic, metals, etc.). Motion of the sensing area relative to such surfaces and materials can also be determined.

The sensing area of the input device 100 encompasses any space above, around, in and/or near the input device 100 in which the input device 100 is able to detect user input, e.g., user input provided by one or more input objects 140. In certain embodiments, the input device 100 is able to detect other conditions, such as an angle at which a foldable device is open, whether a rollable input device is in an open, closed or partially closed state, whether an input device 100 is placed in a cover or protective sleeve, placed in pocket, and immersed in whole or in part in a medium other than air. These are but a few examples.

The sensor electrodes 105 are coupled to the processing system 110 via conductive paths, e.g., traces 150. An exemplary pattern of the sensor electrodes 105 illustrated in FIG. 1 comprises an array of sensor electrodes 105 disposed in a plurality of rows and columns. In one example, the sensor electrodes 105 are disposed in rows, e.g., rows 170-181. In other embodiments, the sensor electrodes may be disposed in columns. In yet other embodiments, the sensor electrodes 105 are disposed in rows and columns. It is contemplated that the sensor electrodes 105 may be arranged in other patterns, such as polar arrays, repeating patterns, non-repeating patterns, non-uniform arrays, or other suitable arrangement. The sensor electrodes 105 may have any suitable shape, such as circular, rectangular, diamond, star, square, nonconvex, convex, nonconcave, concave, or other geometry.

The sensor electrodes 105 may be disposed in a common layer. For example, the sensor electrodes 105 may be disposed on a first side of a common substrate. In other embodiments, the sensor electrodes 105 may be disposed in two or more layers. For example, a portion of the sensor electrodes 105 may be disposed on a first layer and another portion of the sensor electrodes may be disposed on a second layer. The first and second layers may be disposed on different sides of a common substrate, or disposed on different substrates.

The sensor electrodes 105 may be comprised of a conductive material such as a metal mesh, indium tin oxide (ITO), or the like. Further, the sensor electrodes 105 are ohmically isolated from each other such that one or more insulators separate the sensor electrodes and prevent them from electrically shorting to each other.

The processing system 110 includes sensor circuitry 104, also referred to as a sensor circuit. Further, the processing system 110 may include a determination circuit 106. The processing system 110 is configured to operate the sensor electrodes 105 to detect one or more input objects 140 or other condition in the sensing area of the input device 100. The processing system 110 fully or partially resides in one or more integrated circuit (IC) chips. For example, the processing system 110 may include a single IC chip. Alternatively, the processing system 110 includes multiple IC chips. The processing system may also include one or more discrete circuits.

The sensor circuitry 104 is coupled to the sensor electrodes 105 via the routing traces 150 and is configured to drive the sensor electrodes 105 with sensing signals to detect one or more input objects 140 in the sensing area of the input device 100. The sensor circuitry 104 may also be configured to drive the sensor electrodes 105 with other signals, such as guarding signals and/or ground signals.

The sensor circuitry 104 includes digital and/or analog circuitry. For example, the sensor circuitry 104 comprises transmitter (or driver) circuitry configured to drive or transmit sensing signals onto the sensor electrodes 105 and receiver circuitry to receive resulting signals from the sensor electrodes 105. The transmitter circuitry may include one or more amplifiers and/or one or more modulators configured to drive sensing signals on to the sensor electrodes 105.

The processing system 110 may include analog to digital converters (ADCs and/or DACs) 154, analog front ends (AFEs) 152 comprising, for example, integrators configured to receive resulting signals from the sensor electrodes 105. The processing system 110 may include compensation circuitry 156 configured to provide signals to compensate for background capacitance. The ADCs (and/or DACs) 154, AFEs 152 and compensation circuitry 156 may be part of the sensor circuitry 104 or may form different circuits.

The sensor circuitry 104 may drive the sensor electrodes in various modes. In some modes, the sensor circuitry 104 may utilize all sensor electrodes 105 to detect an input object or other condition. In other modes, the sensor circuitry 104 may only utilize a subset of the sensor electrodes 105 to detect an input object or other condition.

In certain embodiments or modes, the sensor circuitry 104 drives a first one or more of the sensor electrodes 105 with a transcapacitive sensing signal and receives a resulting signal with a second one or more of the sensor electrodes 105 to operate the sensor electrodes 105 for transcapacitive sensing. Operating the sensor electrodes 105 for transcapacitive sensing detects changes in capacitive coupling between sensor electrodes driven with a transcapacitive sensing signal and sensor electrodes operated as receiver electrodes. The capacitive coupling may be reduced when an input object (e.g., the input object 140) coupled to a system ground approaches the sensor electrodes. Driving the sensor electrodes 105 with transcapacitive sensing signals comprises modulating the sensor electrodes 105 relative to a reference voltage, e.g., system ground. Transcapacitive sensing may be used in connection with a parallel touch sensing mode as described in FIG. 3A-FIG. 8; however, it will be understood that tanscapactive sensing is not limited to parallel touch sensing modes. For example, non-parallel transcapacitive sensing may include driving rows of the sensor electrodes 105 with a transcapacitive sensing signal and receiving resulting signals from columns of the sensor electrodes 105 and/or vice versa.

The transcapacitive sensing signal is a periodic or aperiodic signal that varies between two or more voltages. Further, the transcapacitive sensing signal typically has a frequency between 50 kHz and 1 MHz, but in other embodiments other frequencies may be utilized. The transcapacitive sensing signal may have a peak-to-peak amplitude in a range of about 1 V to about 10 V. However, in other embodiments, the transcapacitive sensing signal may have a peak-to-peak amplitude greater than about 10 V or less than about 1 V. Additionally, the transcapacitive sensing signal may have a square waveform, a sinusoidal waveform, triangular waveform, a trapezoidal waveform, or a sawtooth waveform, among others.

In some embodiments, operating the sensor electrodes 105 to receive resulting signals comprises holding the sensor electrodes 105 at a substantially constant voltage or modulating the sensor electrodes 105 relative to the transcapacitive sensing signal. A resulting signal includes effect(s) corresponding to one or more transcapacitive sensing signals, and/or to one or more sources of environmental interference, e.g., other electromagnetic signals.

In other embodiments or modes, the sensor circuitry 104 operates the sensor electrodes 105 for absolute capacitive sensing by driving a first one or more of the sensor electrodes 105 with an absolute capacitive sensing signal and receiving a resulting signal with the driven sensor electrodes. Operating the sensor electrodes 105 for absolute capacitive sensing detects changes in capacitive coupling between sensor electrodes driven with an absolute capacitive sensing signal and an input object (e.g., the input object 140). The capacitive coupling of the sensor electrodes 105 driven with the absolute capacitive sensing signal is altered when an input object (e.g., the input object 140) coupled to a system ground approaches the sensor electrodes.

The absolute capacitive sensing signal is a periodic or aperiodic signal that varies between two or more voltages. Further, the absolute capacitive sensing signal typically has a frequency between about 50 kHz and about 1 MHz, but in other embodiments, other frequencies may be utilized. Additionally, the absolute capacitive sensing signal may have a square waveform, a sinusoidal waveform, triangular waveform, a trapezoidal waveform, or a sawtooth waveform, among others. The absolute capacitive sensing signal may have a peak-to-peak amplitude in a range of about 1 V to about 10 V. However, in other embodiments, the absolute capacitive sensing signal may have a peak-to-peak amplitude greater than about 10 V or less than about 1 V. In various embodiments, driving the sensor electrodes 105 with an absolute capacitive sensing signal comprises modulating the sensor electrodes 105. A resulting signal received while performing absolute capacitive sensing may comprise effect(s) corresponding to one or more absolute capacitive sensing signals, and/or to one or more sources of environmental interference, e.g., other electromagnetic signals. The absolute capacitive sensing signal may be the same or different from the transcapacitive sensing signal used in transcapacitance sensing.

In certain embodiments, the sensor circuitry 104 drives a subset of the sensor electrodes 105 with a guard signal. A sensor electrode driven with a guard signal may be referred to as a guarded sensor electrode or guard electrode. Driving a sensor electrode with a guard signal mitigates a voltage difference between the guarded sensor electrode and a sensor electrode driven with the absolute capacitive sensing signal in parallel. Driving the guard signal onto a first one or more sensor electrodes while driving the sensing signal onto a second one or more sensor electrodes results in little or no change in capacitance between the guarded sensor electrode(s) and the sensor electrode(s) driven with the absolute capacitive sensing signal.

It will be appreciated that the sensor circuitry 104 may drive the sensor electrodes 105 in multiple modes. For example, the sensor circuitry 104 may drive the sensor electrodes 105 in a transcapactive mode during a first time period and an absolute capacitive mode during a second time period. Further, the sensor circuitry 104 may drive the sensor electrodes 105 with multiple versions of a particular mode.

For example, the sensor circuitry 104 may drive the sensor electrodes a in parallel transcapactive sensing mode during a first period of time and a non-parallel transcapacitive sensing mode during a second period of time. Non-parallel transcapacitive sensing, for example, involves driving either rows or columns with a transcapacitive sensing signal and reading resulting signals from the other of the rows or columns as previously described. Parallel transcapacitive sensing involves both driving and reading electrodes having generally the same orientation (e.g., non-overlapping).

The determination circuit 106 receives the resulting signals from the sensor circuitry 104 and processes the resulting signals to determine changes in capacitive coupling of the sensor electrodes 105. The determination circuit 106 utilizes the changes in capacitive coupling of the sensor electrodes 105 to determine positional information of one or more input objects (e.g., the input object 140) or to determine a change in capacitance for other reason, e.g., proximity of a surface or material to all or a portion of the sensing area. The determination circuit 106 may perform other functions, such as measuring the amount of noise present in one or more regions of a sensing area and/or determining whether positional information has been corrupted or degraded by noise. In certain embodiments, the determination circuit 106 may combine resulting signals. For example, the determination circuit 106 subtracts a resulting signal from one receiver electrode from a resulting signal from another receiver electrode to form a differential signal. The determination circuit 106 may be part of the sensor circuitry 104 or may form a different circuit.

In one or more embodiments, measurements of the changes in capacitive coupling determined from the resulting signals received from the sensor electrodes 105 may be utilized by the determination circuit 106 to form a capacitive image. The resulting signals utilized to detect the changes in capacitive coupling are received during a capacitive frame. A capacitive frame may correspond to one or more capacitive images. Multiple capacitive images may be acquired over multiple time periods, and differences between the images used to derive information about an input object 140 in the sensing area of the input device 100. For example, successive capacitive images acquired over successive periods of time can be used to track the motion(s) of one or more input objects, materials or surfaces entering, exiting, and within the sensing area.

"Positional information" as used herein broadly encompasses absolute position, relative position, velocity, acceleration, and other types of spatial information in zero, one, two or three dimensions as appropriate. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

Figure 2:
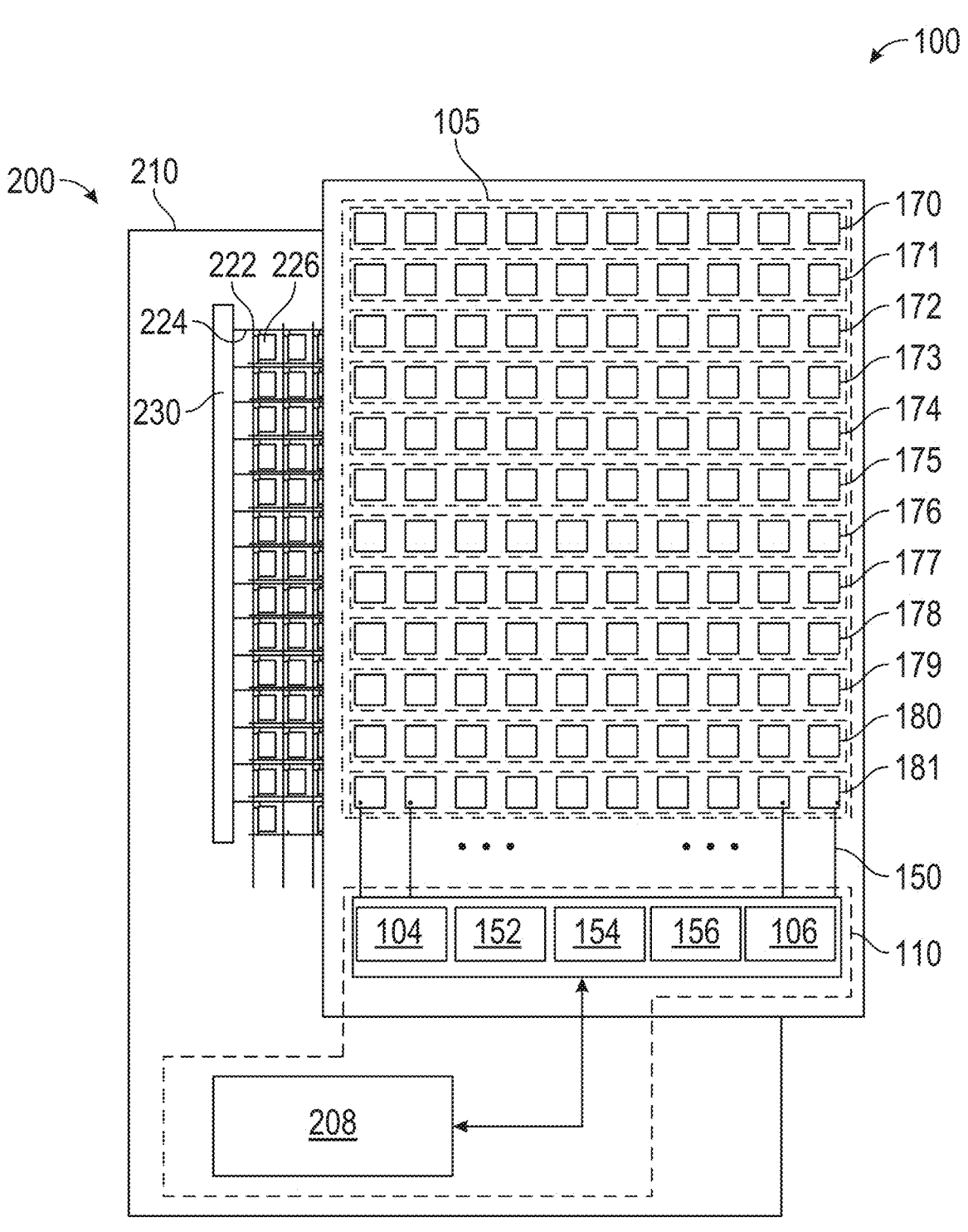
FIG. 2 is a block diagram of an input device with integrated display, according to one or more embodiments.

FIG. 2 illustrates an example of the input device 100 wherein the input device is shown overlapped and/or integrated with a display of a display device 200. The display of the display device 200 may be any suitable type of display such as, for example, light emitting diode (LED), microLED, organic LED (OLED), microOLED, liquid crystal display (LCD), plasma, electroluminescence (EL), or other display technology. The display may be foldable or rollable.

The display device 200 includes a display panel 210 communicatively coupled with a display driver 208 and gate selection circuitry 230. The display panel 210 includes display electrodes that are driven to update subpixel electrodes 226 of the display panel 210. The display electrodes include data lines 222 and gate lines 224, among others. The display driver 208 may be part of the processing system 110 (FIG. 1) or may be a separate component.

The data lines 222 are coupled to the display driver 208 and the gate lines 224 are coupled to the gate selection circuitry 230. Each of the subpixel electrodes 226 is coupled to one of the gate lines 224 and one of the data lines 222. The gate selection circuitry 230 is configured to drive gate select and gate deselect signals onto the gate lines 224 to select (activate) and deselect (deactivate) corresponding subpixels for updating.

The display driver 208 includes display driver circuitry configured to drive the data lines 222 with subpixel data signals to update the selected subpixels electrodes 226 and update the display of the display device 200. For example, the display driver 208 may drive display update signals onto the data lines 222 during corresponding display updating periods.

The display driver 208 is configured to update the subpixel electrodes 226 to update an image displayed on the display panel 210 during display frames. The display frames may be updated, or refreshed, once about every 16 ms, generating a display refresh rate of about 60 Hz. In other embodiments, other display refresh rates may be employed. For example, the display refresh rate may be 90 Hz, 120 Hz, 140 Hz, or greater.

The display driver 208, the sensor circuitry 104, the determination circuit 106, the AFEs 152, the ADCs (and/or DACs) 154, and the compensation circuitry 156 may be part of a common processing system (e.g., the processing system 110 forms a touch and display controller). Alternatively, the display driver 208 may be part of a first processing system and the sensor circuitry 104, AFEs 152, the ADCs (and/or DACs) 154, the compensation circuitry 156, and the determination circuit 106 may be part of a second processing system. Further, the display driver 208, the sensor circuitry 104, the AFEs 152, the ADCs (and/or DACs) 154, the compensation circuitry 156 and the determination circuit 106 may be part of a common IC chip. Alternatively, one or more of these components may be disposed in a first IC chip and a second one or more of these components may be disposed on a second IC chip, etc. As an alternative, any of the sensor circuitry 104, AFEs 152, the ADCs (and/or DACs) 154, the compensation circuitry 156, and/or the determination circuit 106 may be implemented in whole or in part by one or more discrete circuits.

In various embodiments, the sensor circuitry 104 is configured to drive the sensor electrodes for capacitive sensing during a capacitive frame at a capacitive frame rate. Further, each capacitive frame may include multiple periods during which different sensor electrodes 105 are operated for capacitive sensing.

The "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or multiple of the display frame rate. Further, the capacitive frame rate may be a rational fraction of the display rate (e.g., $\frac{1}{2}$, $\frac{2}{3}$, 1, $\frac{3}{2}$, 2). In one or more embodiments, the display frame rate may change while the capacitive frame rate remains constant. In other embodiment, the display frame rate may remain constant while the capacitive frame rate is increased or decreased. Alternately, the capacitive frame rate may be unsynchronized from the display refresh rate or the capacitive frame rate may be a non-rational fraction of the display rate to minimize interference "beat frequencies" between the display updating and the input sensing.

In one or more embodiments, capacitive sensing (or input sensing) and display updating may occur during at least partially overlapping periods. For example, the sensor circuitry 104 is configured to operate the sensor electrodes 105 for capacitive sensing while the display driver 208 operates the gate lines 224 and data lines 222 to update an image displayed by the display panel 210. For example, updating the display panel 210 and operating the sensor electrodes 105 for capacitive sensing may be asynchronous with each other. Further, updating the display panel 210 and operating the sensor electrodes 105 for capacitive sensing may or may not be synchronized with each other.

In one or more embodiments, updating the display panel 210 and operating the sensor electrodes 105 for capacitive sensing may occur during non-overlapping periods. For example, updating the display panel 210 may occur during display update periods and operating the sensor electrodes 105 for capacitive sensing may occur during non-display update periods. The non-display update periods may be a blanking period that occurs between the last line of a display frame and the first line of the following display frame (e.g., during a vertical blanking period). Further, the non-display update periods may occur between display line update periods for two consecutive display lines of a display frame and are at least as long in time as the display line update period. In such embodiments, the non-display update period may be referred to as a long horizontal blanking period or long h-blanking period, where the blanking period occurs between two display line updating periods within a display frame and is at least as long as a display line update period.

FIG. 3A-FIG. 3D illustrate examples of an input device 100 with a touch sensor including sensor electrodes 105 configured for differential parallel sensing in accordance with certain embodiments. In the examples, the sensor electrodes 105 may be operated in a transcapacitive sensing mode. The sensor electrodes 105 used for differential parallel sensing may include all or only a subset of the sensor electrodes 105 of the input device 100. For example, for a 16 by 40 electrode touch sensor, a differential parallel sensing mode may only include 6 transmitter and 10 receiver electrodes as compared to 16 transmitter electrodes and 40 receiver electrodes for non-parallel transcapacitive sensing. Of course, this is provided by way of example only and all of the sensor electrodes 105 or any suitable subset thereof may be employed as will be apparent from the description that follows. Further, any suitable number of transmitter and receiver electrodes may be used as will be apparent from the description that follows.

In general, each of FIG. 3A-FIG. 3D illustrates a plurality of sets or groups of electrodes. Each set or group of electrodes includes a positive transmitter electrode, a negative transmitter electrode and a differential pair of receiver electrodes disposed between the positive transmitter electrode and negative transmitter electrode. As will become apparent from the description that follows, the sets of electrodes may overlap, e.g., a transmitter electrode at the edge of one set may be part of an adjacent set of electrodes.

Figure 3A:
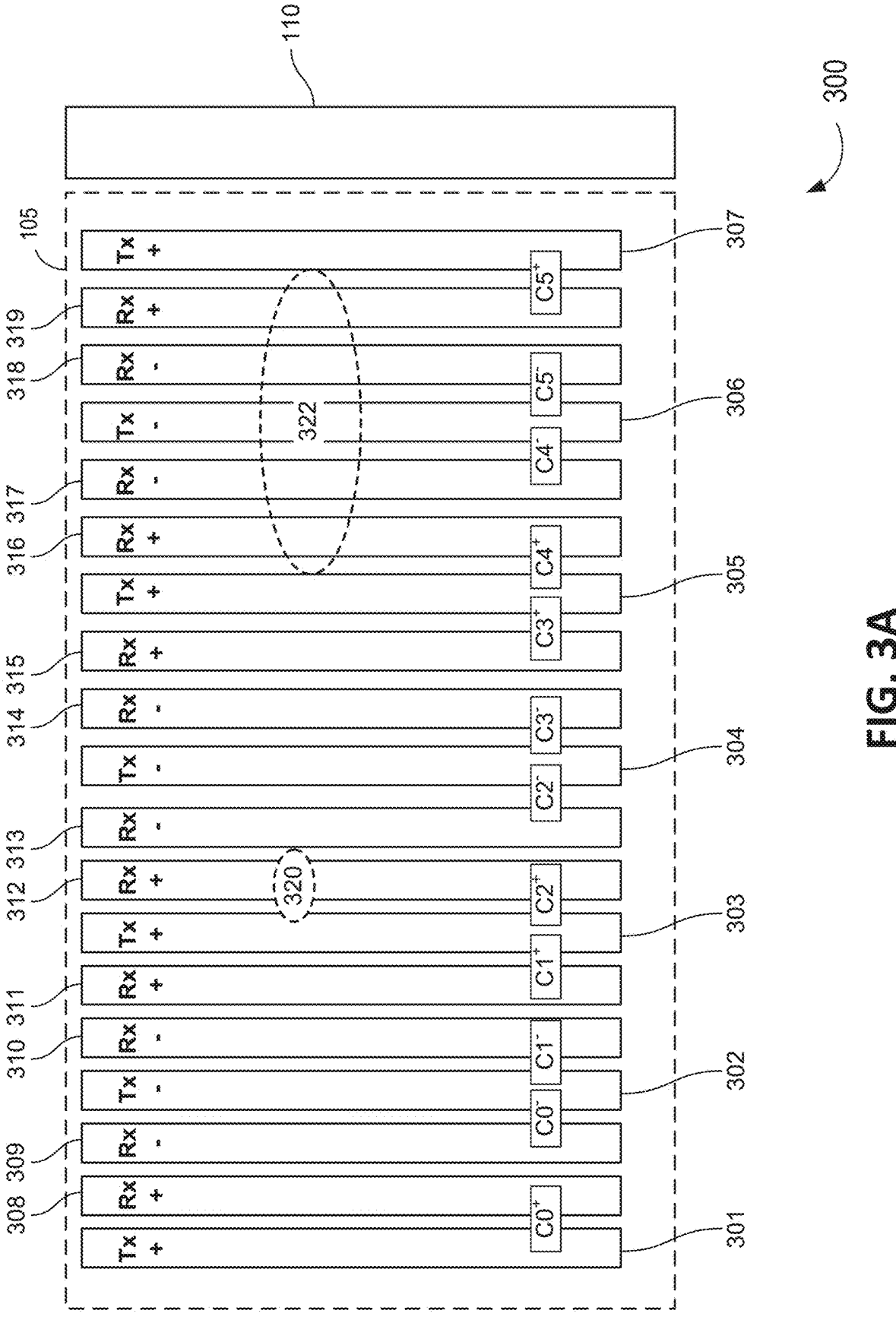
FIG. 3A is a block diagram of a touch sensor with electrodes configured for differential parallel touch sensing, according to one or more embodiments.

FIG. 3A illustrates an example of an input device 100 with a touch sensor 300 including sensor electrodes 105 configured for differential parallel sensing in accordance with certain embodiments. In FIG. 3A, a plurality of sets of sensor electrodes 301-319 are depicted as being disposed generally parallel to one another, e.g., in a non-overlapping manner. Although sensor electrodes 301-319 are shown vertically, they may have any desired orientation, e.g., horizontal or at an angle. It will be understood that, although each of sensor electrodes 301-319 is shown as a single sensor element, each of the sensor electrodes 301-319 may include one or more individual sensor electrodes 105, for example, as shown and described in connection with rows or columns 170-181 in FIG. 1.

The embodiment shown in FIG. 3A shows seven transmitter electrodes 301-307 and twelve receiver electrodes 308-319. The number of transmitter and receiver electrodes is not limited to the number shown and will vary considerably depending, for example, on the size of the overall touch sensor, desired resolution, pitch of sensor electrodes, and desired size of sensor used for parallel sensing.

A first subset of the transmitter electrodes 301, 303, 305 and 307 are positive polarity transmitter electrodes, referred to as positive transmitter electrodes, and a second subset of the transmitter electrodes 302, 304, and 306 are negative polarity transmitter electrodes, referred to as negative transmitter of electrodes. The positive and negative transmitter electrodes are spatially disposed in alternating fashion, e.g., the positive transmitter electrode 301 is spatially followed by the negative transmitter electrode 302, which is spatially followed by the positive transmitter electrode 303 and so forth. As will be described further below, positive transmitter electrodes are driven with a positive sensing signal and the negative transmitter electrodes are driven with a relative negative or opposite polarity sensing signal. For example, the negative sensing signal may be the inverse of the positive transmitter signal where the negative sensing signal is 180 degrees out of phase with the positive sensing signal. Alternating the polarity or phase of the transmitter sensing signals helps mitigate touch to display (T2D) noise. In some embodiments, a transmitter electrode may be driven with a positive sensing signal at one point in time and may be driven with a negative sensing signal at another point in time and vice versa. Thus, the term positive transmitter electrode and/or negative transmitter electrode may be relative to a specific point in time.

Figure 3B:
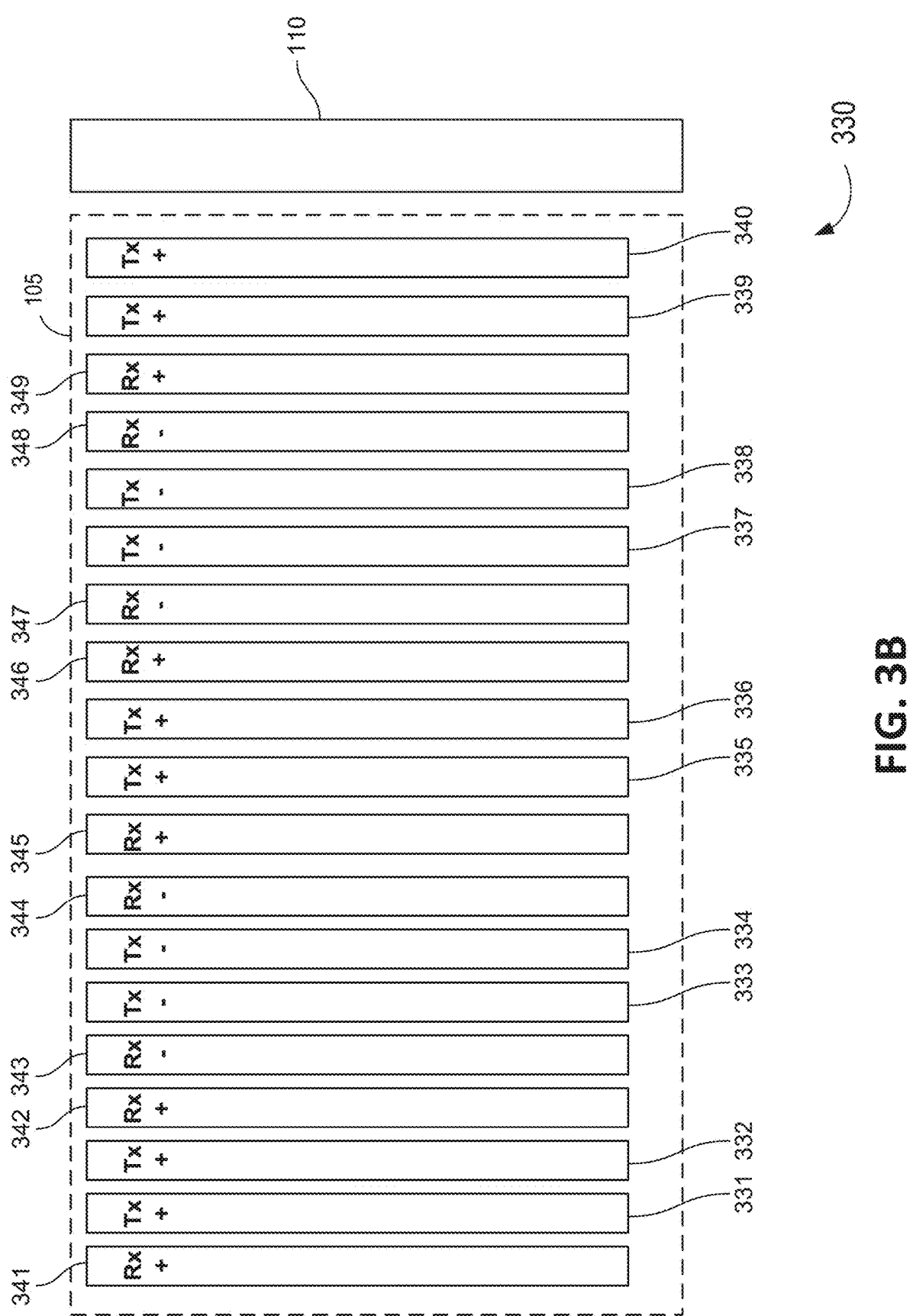
FIG. 3B is a block diagram of a touch sensor with electrodes configured for differential parallel touch sensing, according to one or more embodiments

In certain embodiments, such as shown in FIG. 3B described below, each transmitter electrode 301-307 may comprise multiple electrodes. For example, positive transmitter electrode 301 may include two or more adjacent positive transmitter electrodes. Using multiple adjacent transmitter electrodes can increase signal strength and reduce the number of receiver electrodes where desired.

Receiver electrodes 308, 311, 312, 315, 316 and 319 are positive receiver electrodes that are disposed for capacitive coupling to at least one respective positive transmitter electrode. For example, positive receiver electrode 308 is adjacent and capacitively coupled to positive transmitter electrode 301. As a second example, positive receiver electrode 319 is adjacent and capacitively coupled to positive transmitter electrode 307. Each receiver electrode 308-319 may likewise comprise multiple adjacent receiver electrodes.

Receiver electrodes 309, 310, 313, 314, 317, and 318 are negative receiver electrodes that are disposed for capacitive coupling to a respective negative transmitter electrode. For example, the negative receiver electrode 309 is adjacent and capacitively coupled to the negative transmitter electrode 302. As a second example, the negative receiver electrode 318 is adjacent and capacitively coupled to the negative transmitter electrode 306. The positive and negative receiver electrodes will generate resulting signals having a signal strength depending on the presence or absence of a proximate input object, material or surface. The resulting signals may also include noise caused by a display or other source, one illustrative example of which is zebra noise caused by displayed zebra patterns, e.g., patterns which have alternating dark and light rows or columns.

In many instances, a transmitter electrode is coupled to multiple receiver electrodes. For example, negative transmitter electrode 302 is coupled to both negative receiver electrode 309 and negative receiver electrode 310.

Capacitive coupling exists between the transmitter electrodes and adjacent receiver electrodes. For example, as illustratively shown, capacitance $C0^+$ represents the capacitive coupling between positive transmitter electrode 301 and positive receiver electrode 308. Capacitance $C0^-$ represents the capacitive coupling between negative transmitter electrode 302 and negative receiver electrode 309 and so forth. The amount of capacitive coupling varies depending on the presence or absence of an input object, surface or material as well as other factors as previously described.

The arrangement of transmitter and receiver electrodes as shown in the example of FIG. 3A results in differential pairs of positive and negative receiver electrodes interposed between positive and negative transmitter electrodes. For example, a first differential receiver pair, which may be referred to as DP0, includes positive receiver electrode 308 and negative receiver electrode 309 and is disposed between positive transmitter electrode 301 and negative transmitter electrode 302, which can be considered a first set of electrodes. Similarly, a second differential receiver pair, which may be referred to as DP1, includes negative receiver electrode 310 and positive receiver electrode 311 and is disposed between negative transmitter electrode 302 and positive transmitter electrode 303, which can be considered a second set of electrodes, and so forth. Each receiver pair, e.g., adjacent set of receiver electrodes, forms a differential pair.

Noise may be mitigated by combining resulting signals. For example, noise may be mitigated by subtracting a resulting signal read from one receiver electrode in the differential pair from a resulting signal read from the other receiver electrode in the differential pair, e.g., by subtracting the resulting signal read from negative receiver electrode 309 from the resulting signal read from positive receiver electrode 308. Noise is minimized or eliminated because noise will tend to affect each receiver electrode in a differential pair in the same way. Thus, subtracting one resulting signal from another resulting signal cancels out or mitigates noise, such as display noise. Further, assuming an input object is proximate to both the positive and negative receiver electrodes in a differential pair, e.g., electrodes 308 and 309, subtracting the resulting signal of one receiver electrode from the other receiver electrode may result in an approximate doubling of the resulting signal.

FIG. 3A illustrates an example with a total of 19 electrodes. Such an exemplary arrangement may include a positive transmitter electrode at each end of the sensor electrodes 105. Numerous other arrangements are possible.

For example, in an 18 electrode arrangement, one of the edge transmitter electrodes may be removed. As another example, in a 17 electrode arrangement, both edge transmitter electrodes may be removed. As yet another example, in a 16 electrode arrangement, three consecutive electrodes may be removed, e.g., the three farthest right or the three farthest left electrodes shown in FIG. 3A. These configurations are, of course, provided by way of example and not limitation.

In general, positive and negative receiver electrodes are always provided in pairs while the edge transmitter electrodes may not be present depending on the total number of electrodes and the pattern used to drive the electrodes. However, with respect to positive and negative transmitter electrodes, the row sum of total drive transmitter electrodes will typically either be 0 (equal number of positive and negative transmitter electrodes) or 1 (unequal number of positive and negative electrodes). These configurations minimize touch to display (T2D) noise because noise on the positive transmitter electrodes will generally cancel out or minimize noise on the negative transmitter electrodes.

In some implementations, the transmitter electrodes and the receiver electrodes may be sequentially shifted over time, which process may include, for example, converting one or more transmitter electrodes to a receiver electrode and converting one or more receiver electrodes to an opposite polarity receiver electrode or to a transmitter electrode. For example, FIG. 3A may represent the configuration of transmitter and receiver electrodes during a first time period, e.g., first capacitive frame. During a second subsequent time period, e.g., second subsequent capacitive frame, the configuration may be shifted such that electrode 308 becomes a positive transmitter electrode, electrode 309 becomes a positive receiver electrode, electrode 302 becomes a negative receiver electrode, electrode 310 becomes a negative transmitter electrode, and so forth. This sequence reflects a shift from left to right, but a shift from right to left is also contemplated. Shifting the electrodes as described can facilitate increasing resolution and minimizing dead spots in the sensing area, e.g., where an input object, surface or material is directly over a transmitter electrode or centered between receiver electrodes. Sequential shifting of electrodes is further shown and described in connection with FIG. 3D.

In operation, a touch controller or other processing system 110 (e.g., sensor circuitry), drives the positive transmitter electrodes with a positive polarity sensing signal and drives the negative transmitter electrodes with, for example, an opposite polarity sensing signal (such as a negative or inverse of a positive sensing signal) to create a differential signal. The processing system 110 (e.g., sensor circuitry) reads the resulting signals on the receiver electrodes and may process them as differential resulting signals. For example, the resulting signal at positive receiver electrode 308 ($C0^+$) and the resulting signal at negative receiver electrode 309 ($CO^-$) are read and processed as a differential pair. Likewise, the processing system 110 reads and processes the resulting signals at each of the receiver pairs 310 ($C1^-$), 311 ($C1^+$); receiver pairs 312 ($C2^+$), 313 ($C2^-$); receiver pairs 314 ($C3^-$), 315 ($C3^+$); receiver pairs 316 ($C4^+$), 317 ($C4^-$) and receiver pairs 318 ($C5^-$), 319 ($C5^+$). The resulting signals of each pair are combined, e.g., processed as a difference signal ($Ci^+ - Ci^-$) where Ci corresponds to the capacitive coupling between a transmitter electrode and adjacent receiver electrode. Thus, one resulting signal may be subtracted from the other resulting signal thereby mitigating noise as previously described. Before the resulting signals are processed in this matter, other noise removal techniques, such as Analog Display Noise Suppression (ADNS) or the like, may be applied to the resulting signals to avoid saturation of system components such as AFEs.

The embodiment of FIG. 3A illustrates a touch sensor with what may be referred to as a pitch of three. This is because one difference signal is obtained for each differential pair which translates to one measurement per three electrodes.

The embodiments described herein provide for accurate detection of both small and large objects without sacrificing noise mitigation. For example, a small object, including but not limited to a finger, stylus, surface or material, may touch or be proximate to the touch sensor device at location 320. The location 320 of the first touch (or proximity) is closer to receiver electrode 312 as compared to receiver electrode 313. As a result of a difference in capacitive coupling, the touch generates a different resulting signal at receiver electrode 312 than the resulting signal at receiver electrode 313. These different resulting signals are analyzed by the processing system 110. The differential signal will be interpreted by the processing system 110 as a touch at the location of receiver electrode 312 when, for example, the differential signal exceeds a threshold. The differential signal at other differential pairs, e.g., 314, 315, will be near zero or at least below a threshold thereby indicating that no object has touched the touch sensor device along receiver electrodes 314, 315.

As another example, a large object, including but not limited to a palm or side of a hand (or other surface or material), may touch or be proximate to the touch sensor device at location 322. The location 322 of the second touch (or proximity) covers a larger area than the location 320 of the first touch and, for example, generally covers and capacitively couples to a plurality of differential receiver pairs, e.g., electrodes 316, 317, and 318, 319. The differential signal measured by the processing system 110 at each differential pair will be relatively large, e.g., exceed a threshold, thereby signaling that an object has touched the touch sensor device in the region of receiver electrodes 316, 317 and 318 and 319. As with the example of the small object at location 320, the differential signal at other differential pairs, e.g., 308, 309 will be near zero or below a threshold thereby indicating that no object has touched the touch sensor device at the location of the other receiver electrodes.

In the case of both small objects, e.g., the first touch at location 320, and larger objects, e.g., the second touch at location 322, the differential signals pairs are read and combined, e.g., processed as a difference signal, e.g., one signal is subtracted from the other thereby cancelling noise. Unlike conventional touch sensors, the arrangement therefore mitigates noise and accurately detects touches from objects of various sizes including relatively large objects.

It will be understood that the touch sensor need not exclusively operate in a differential parallel transcapacitive sensing mode. For example, the touch sensor may at various times be operated in a non-parallel transcapacitive mode where sensors of one orientation, e.g., rows, are driven by a sensing signal and resulting signals are read from electrodes of another orientation, e.g., columns, and vice versa. The electrodes may then be operated for differential parallel transcapacitive sensing in another mode. At various times, the electrodes may also be operated for absolute capacitive sensing in yet another mode.

FIG. 3B illustrates another example of an input device 100 with a touch sensor 330 including sensor electrodes 105 configured for differential parallel sensing in accordance with certain embodiments. The embodiment of FIG. 3B shows ten transmitter electrodes 331-340 and nine receiver electrodes 341-349. As with FIG. 3A, the number of transmitter and receiver electrodes is not limited to the number shown.

Similar to the embodiment of FIG. 3A, differential pairs of receiver electrodes are interposed between positive and negative transmitter electrodes. FIG. 3B differs from the arrangement shown in FIG. 3A in that transmitter electrodes are provided in adjacent pairs. For example, positive receiver electrode 342 and negative receiver electrode 343 represent a differential pair of receiver electrodes. The positive receiver electrode 342 is adjacent to two positive transmitter electrodes, namely, positive transmitter electrode 331 and positive transmitter electrode 332. Similarly negative receiver electrode 343 is adjacent to two negative transmitter electrodes, namely negative transmitter electrode 333 and negative transmitter electrode 334.

Thus, while FIG. 3A shows an arrangement with a pitch of three, FIG. 3B illustrates a touch sensor with a pitch of four. This is because one differential resulting signal is obtained for each differential pair of receiver electrodes, e.g., one measurement per four electrodes. Because the positive transmitter electrodes and negative transmitter electrodes are provided in pairs, stronger sensing signals can be provided which can provide increased sensitivity. Further, for a given number of total electrodes, fewer receiver electrodes are provided. In embodiments where each receiver electrode is coupled to an AFE, which may be referred to as a receiver channel, fewer AFEs are needed. By way of illustration, the configuration of FIG. 3A includes 12 receiver electrodes, e.g. 12 channels, which may require 12 AFEs. By comparison, the configuration of FIG. 3B, which has the same total number of electrodes as FIG. 3A, includes 9 receiver electrodes (channels) and hence only requires 9 AFEs.

The configuration of FIG. 3B may provide lower resolution, i.e., a larger pitch, than the configuration of FIG. 3A. However, many implementations do not require high resolution, such as detecting when the touch sensor is placed in a case or pocket or to transition an electronic device from a doze mode to an active mode. Further, any decrease in resolution can be eliminated or minimized using sequential differential parallel sensing as described, for example, in FIG. 3D.

The configuration of FIG. 3B is but one alternative to the arrangement of FIG. 3A. For example, transmitter electrodes can be provided in groups of three, e.g., three consecutive electrodes may be positive transmitter electrodes and three consecutive electrodes may be negative transmitter electrodes with differential pairs of receiver electrodes interposed in between. Any number of consecutive electrodes may serve as positive or negative transmitter electrodes and the number of consecutive positive electrodes need not match the number of consecutive negative electrodes. Further, it is contemplated that receiver electrodes may similarly comprise more than one electrode. For example, positive receiver electrode 342 could comprise two, three or more adjacent electrodes.

Figure 3C:
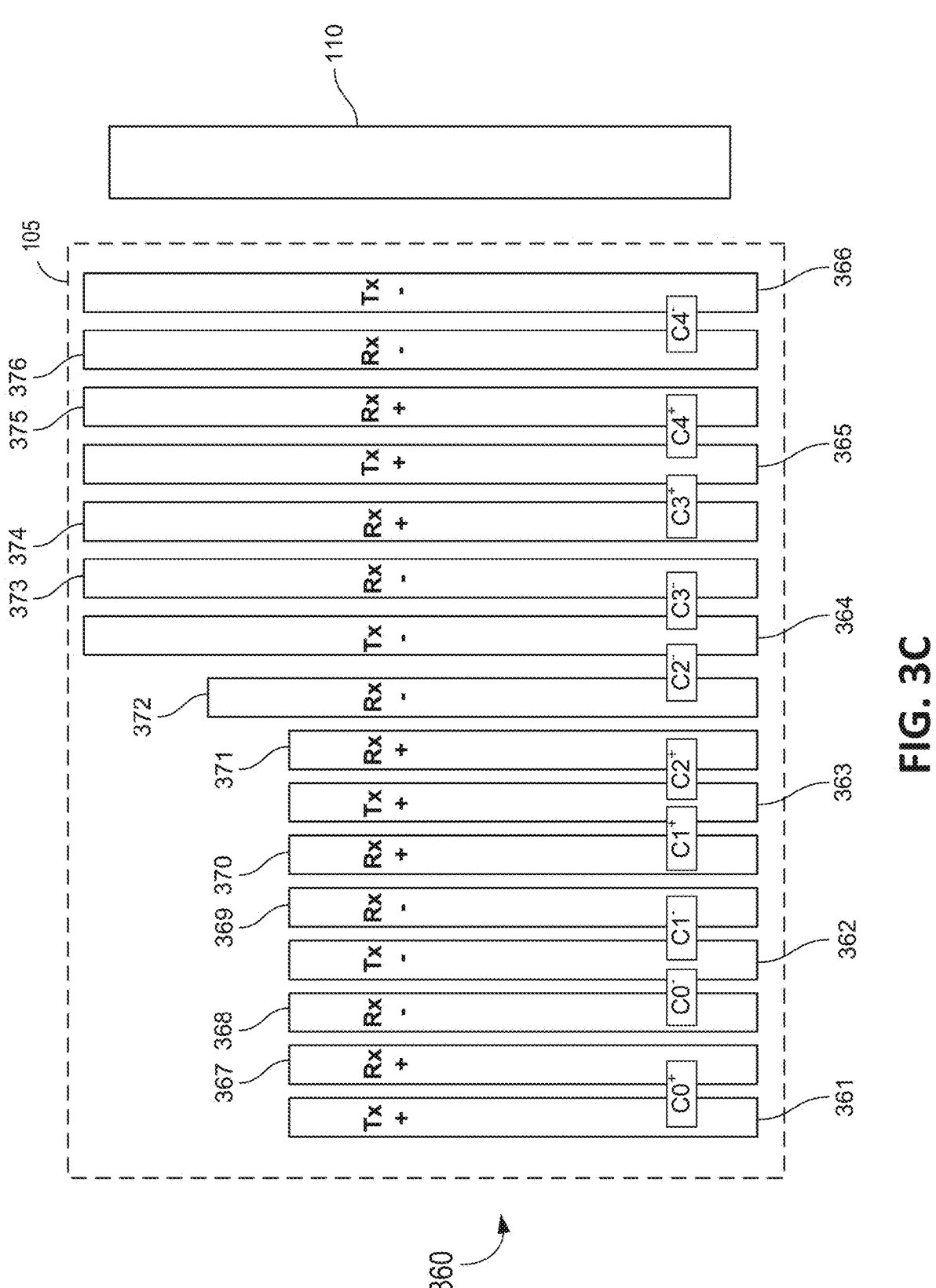
FIG. 3C is a block diagram of a touch sensor with electrodes configured for differential parallel touch sensing, according to one or more embodiments

FIG. 3C illustrates another example of a touch sensor 360 having sensor electrodes 105 configured for differential parallel sensing in accordance with certain embodiments. As with the example of FIG. 3A, the sensor electrodes as shown in FIG. 3C may be operated at least at certain times in a differential parallel sensing mode using transcapacitance.

Operation of the touch sensor 360 shown in FIG. 3C is substantially the same as the example shown in FIG. 3A and is, therefore, not repeated.

Sensor electrodes 361-376 are depicted as being disposed generally parallel to one another and, although depicted vertically, may have any desired orientation. The embodiment shown in FIG. 3C shows six transmitter electrodes 361-366 and ten receiver electrodes 367-376, but, as with FIG. 3A, the embodiment is not limited to any particular number of electrodes and any suitable number may be employed. The transmitter electrodes are spatially disposed with alternating polarity, e.g., a positive transmitter electrode 361 followed by a negative transmitter electrode 362 followed by a positive transmitter electrode 363 and so forth. The positive transmitter electrodes may be driven with a positive sensing signal that is the inverse, e.g., 180 degrees out of phase, with a negative sensing signal used to drive the negative transmitter electrodes. The alternating positive and negative transmitter electrodes mitigate T2D noise as previously described.

Receiver electrodes 367-376 are arranged as differential pairs between positive and negative transmitter electrodes. For example, positive receiver electrode 367 is adjacent and capacitively coupled to the positive transmitter electrode 361 and negative receiver electrode 368 is adjacent and capacitively coupled to negative transmitter electrode 362. As a second example, negative receiver electrode 376 is adjacent and capacitively coupled to negative transmitter electrode 366 and positive receiver electrode 375 is adjacent and capacitively coupled to positive transmitter electrode 365. The arrangement of differential pairs of receiver electrodes mitigates display noise as previously described.

Unlike the example of FIG. 3A, however, the touch sensor 360 shown in FIG. 3C includes mismatched electrodes, e.g., transmitter and/or receiver sensor electrodes having different lengths. For example, transmitter electrodes 364-366 and receiver electrodes 372-376 are longer than transmitter electrodes 361-363 and receiver electrodes 367-371. Further, in the example shown, at least one differential pair of receiver electrodes 371, 372 are mismatched in that negative receiver electrode 372 is longer than positive receiver electrode 371. In the particular example, the longer electrodes are disposed closer to the processing system 110 relative to the shorter electrodes, although embodiments herein contemplate varying lengths of electrodes without limitation as to their relative location.

Embodiments with transmitter and receiver electrodes of varying lengths remain effective at mitigating noise and accurately detecting touches of various sizes notwithstanding mismatches in the size. It will be appreciated that any mismatch in size of the transmitter electrodes, e.g., transmitter electrodes 361-336, is less critical from the standpoint of noise reduction. Although mismatch between receiver electrodes may be more significant, the configuration minimizes the impact on display noise mitigation. For example, in the example, some mismatch exists in the size of receivers of differential receiver electrode pair 371, 372. However, the impact on noise reduction can be minimized by keeping the amount of mismatch minimal, e.g., less than 80 percent or less than 90 percent or less than 6 percent and/or by disposing the location of mismatch close to the processing system 110 relative to the far edge of the sensor.

It will also be understood that the configuration of FIG. 3C may be modified similar to that of FIG. 3B. For example, each positive and negative transmitter electrode shown may comprise multiple electrodes, e.g., may be provided as a consecutive pair of electrodes or as three consecutive electrodes, four consecutive electrodes and so forth.

Figure 3D:
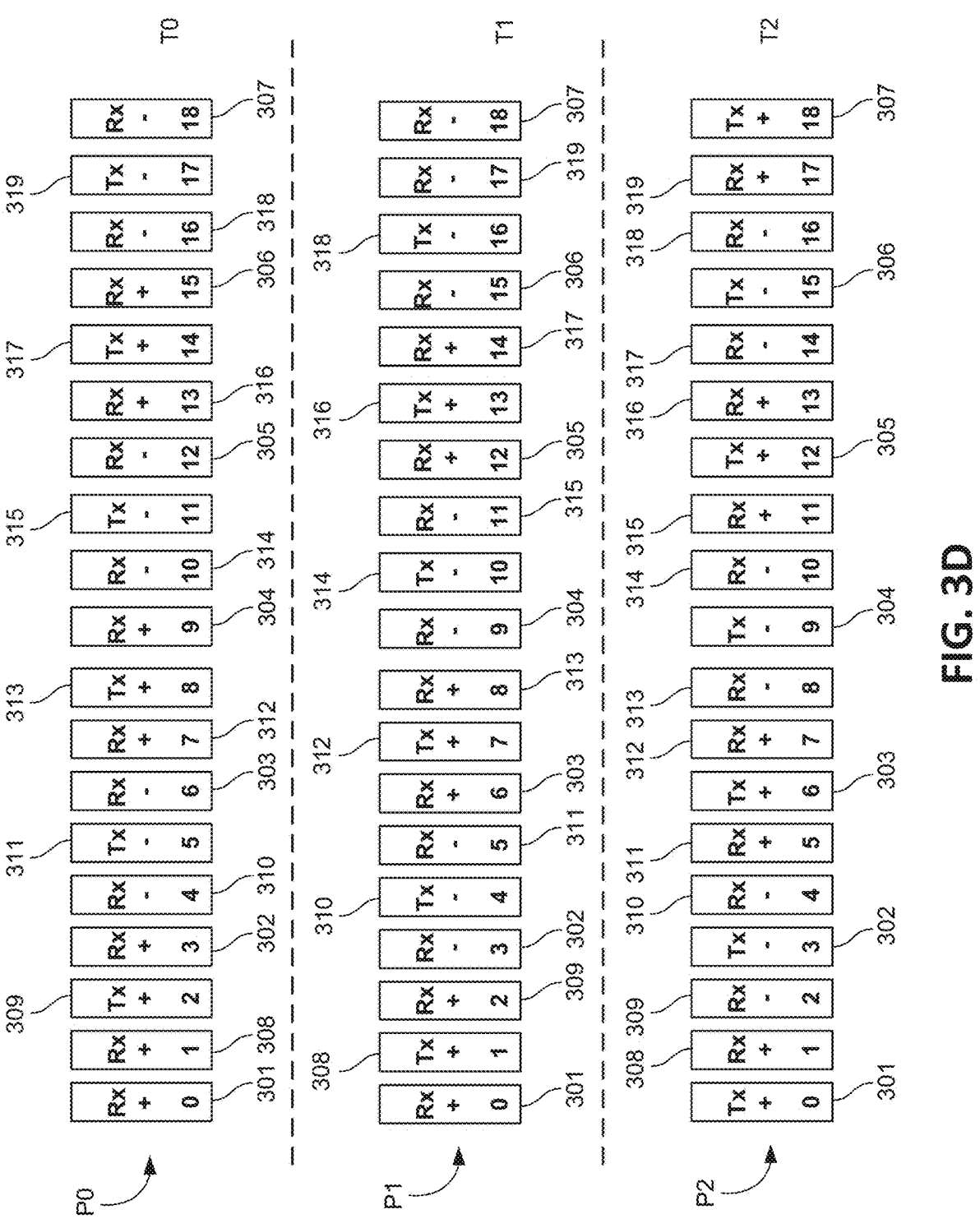
FIG. 3D is a block diagram of a touch sensor with electrodes configured for sequential differential parallel touch sensing, according to one or more embodiments.

FIG. 3D illustrates an example of sequential differential parallel differential sensing. The example generally illustrates the electrode configuration of FIG. 3A with the transmitter electrodes and receiver electrodes driven in three patterns labelled P0, P1 and P2. It will be appreciated that the sequential differential parallel sensing described in FIG. 3D could be applied to any suitable electrode configuration including those described in FIG. 3B-FIG. 3C. The transmitter and receiver electrodes 301 through 319 are labelled 0 through 18, which number represents a position of the electrode in the series of electrodes and which may in certain implementations correspond to a channel number.

Pattern P0 represents the configuration of transmitter and receiver electrodes at a first period of time T0; pattern P1 represents the configuration of the transmitter and the receiver electrodes at a second period of time T1; and pattern P2 represents the configuration of the transmitter and the receiver electrodes at a third period of time T2. The first, second and third periods of time may be consecutive periods of time, although in other embodiments they may be non-consecutive periods of time. The first, second and third periods of time may follow or precede other sensing modes, e.g., may follow or precede an absolute sensing period and/or non-parallel transcapacitive sensing period.

As shown, for pattern P0, the configuration at time T0 includes, in order, positive receiver electrode 308, positive transmitter electrode 309, positive receiver electrode 302, negative receiver electrode 310 negative transmitter electrode 311, and negative receiver electrode 303, which pattern then generally repeats. It will noted that edge positive receiver electrode 301 does not follow the general pattern. Edge receiver electrodes will typically match the polarity of the nearest transmitter electrode. Since transmitter electrode 309 is positive, receiver electrode 301 is also positive in pattern P0.

For pattern P1, the configuration at time T1 includes, in order, positive transmitter electrode 308, positive receiver electrode 309, negative receiver electrode 302, negative transmitter electrode 310, negative receiver electrode 311, and positive receiver electrode 303, which pattern then generally repeats. As generally shown, pattern P1 is effectively a shift of the pattern P0 to the left by one electrode. For example, the positive transmitter electrode 309 in pattern P0 is effectively moved to electrode 308 in pattern P1 and so forth. Similar to pattern P0, it will be noted that edge negative receiver electrode 307 does not follow the general pattern. Since the nearest transmitter electrode 318 is negative, the polarity of receiver electrode 307 is likewise negative in pattern P1.

For pattern P2, the configuration at time T2 includes, in order, positive receiver electrode 308, negative receiver electrode 309, negative transmitter electrode 302, negative receiver electrode 310, positive receiver electrode 311, and positive transmitter electrode 303, which pattern then repeats. Thus, pattern P2 is effectively a shift of the pattern P1 to the left by one electrode. For example, the positive transmitter electrode 308 in pattern P1 is moved to electrode 301 in pattern P2 and so forth. Since both edge electrodes, i.e., electrode 301 and electrode 307 are transmitter electrodes, there is no need to deviate from the general pattern of pattern P2.

Operation of the touch sensor in FIG. 3D at each of the time periods T0, T1 and T2 is as generally described in connection with FIG. 3A. Touch controller or other processing system 110 drives the positive transmitter electrodes with a positive polarity sensing signal and drives the negative transmitter electrodes with, for example, an opposite polarity sensing signal (such as a negative or inverse of positive sensing signal) to create a differential signal. The processing system 110 reads the resulting signals on the receiver electrodes and may process them as differential resulting signals. For example, at time T0, the processing system reads a resulting signal from negative receiver electrode 310 and subtracts the signal (or a processed version of the signal, e.g., by subtracting a baseline) from the resulting signal of positive receiver electrode 302 (or processed version of the signal). The process is repeated for pattern P0 for each differential pair at time T0. The process is then further repeated for pattern P1 at time T1 and for pattern P2 at time T2.

It will be appreciated that the sequential differential parallel sensing as shown in FIG. 3D increases the resolution of imaging and detection of an input object. Each pattern in FIG. 3D has a pitch of three, which corresponds to one differential signal per three electrodes. However, in combination, the three patterns provide a pitch of one thereby improving sensitivity of the touch sensor. In certain embodiments, the sequential differential parallel sensing may be used with fewer periods, for example, two periods such as T0 and T1 or T0 and T3 or T2 and T3. In that case, the resolution will decrease correspondingly, but sensing time may be reduced.

It will also be appreciated that the example of FIG. 3D illustrates an example of a single transmitter electrode disposed on each side of each differential pair of receiver electrodes. The sequential differential capacitive sensing of FIG. 3D may also be used with the configuration of FIG. 3B. When used with configuration of FIG. 3B, additional sensing periods may be needed to achieve desired or full resolution. For example, four patterns with four time periods may be used to achieve a pitch of one, although fewer may be used depending on the desired resolution.

Figures 4A, 4B:
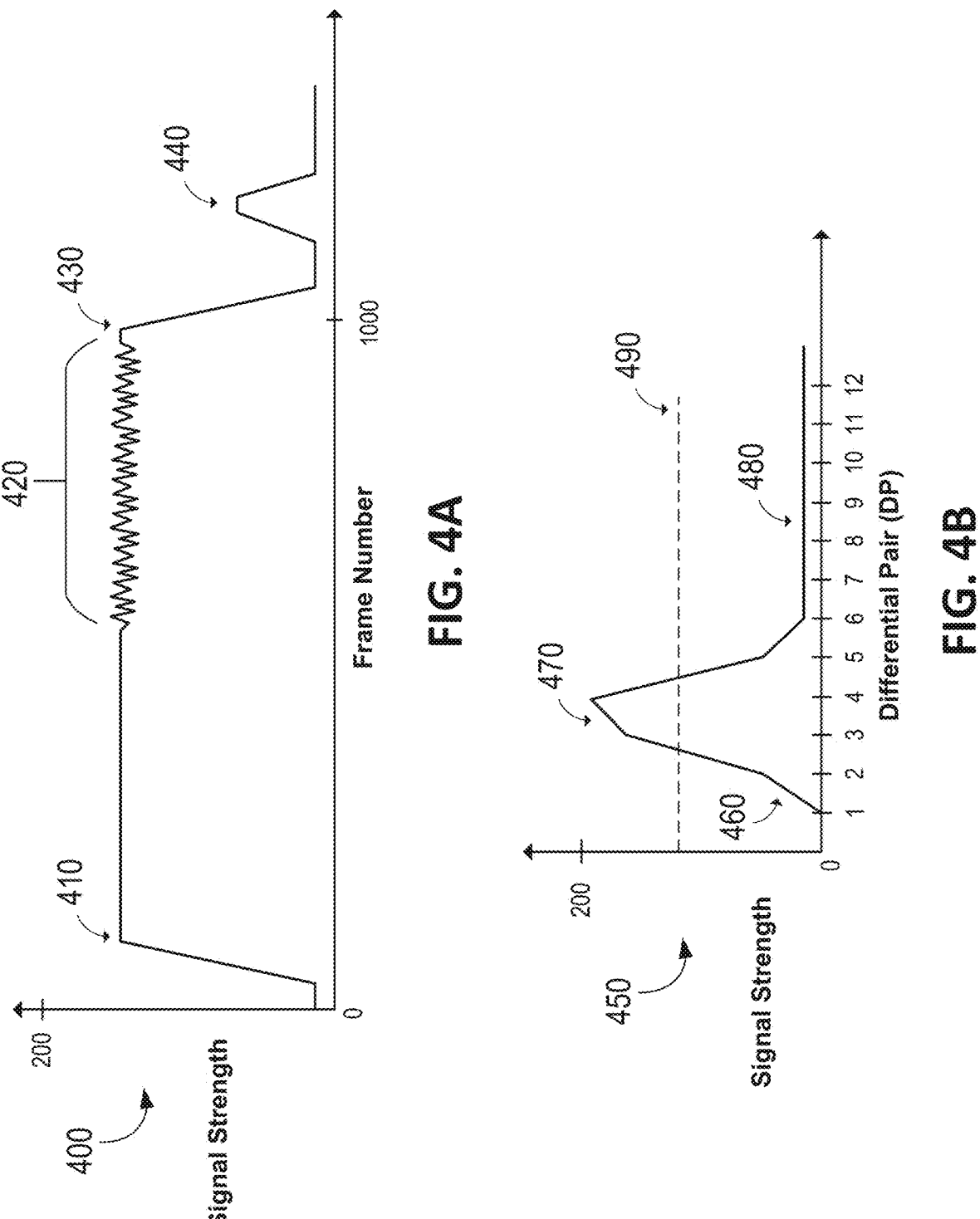
FIG. 4A illustrates a waveform of a resulting signal from differential receiver electrodes in a touch sensor device over a series of frames, according to one or more embodiments.
FIG. 4B illustrates a waveform of resulting signals across a plurality of differential receiver electrodes in a touch sensor device, according to one or more embodiments.

FIG. 4A illustrates a waveform 400 of a differential receiver electrode signal in a touch sensor device in an area proximate to a touch over a series of capacitive sensing frames in the presence of noise. The y-axis (vertical axis) indicates signal strength of the differential signal measured at one or more differential receiver electrode pairs in the area of touch. As one example, the y-axis may indicate the signal level of the differential signal measured between receiver electrodes as illustrated and described in connection with FIG. 3A. The x-axis (horizontal axis) indicates frame numbers, e.g., a sequence of measurements over time. As can be seen from FIG. 4A, resulting signals can be read over a series of frames with each frame representing readings taken over some or all receiver electrodes from a burst of a sensing signal.

At time 410, a large object, surface or material may be placed on the touch sensor device, including but not limited to a palm or side of a hand such as illustrated by the location 322 of the second touch in FIG. 3A. The resulting signal level may increase at the receiver electrodes proximate to the area of the touch, reflective of the large differential signal received at the receiver electrode pairs. At time 420, an interference signal may be introduced, e.g., display interference from display of a zebra pattern, although it will be understood that the embodiments herein are effective in mitigating various types of noise. As can be seen, the resulting signal strength attributable to the touch is much larger than the noise as a result of the mitigation provided by, for example, the differential measurements.

At time 430, the large object may be removed from contact with the touch sensor device. Also illustrated in FIG. 4A is a signal from a touch of a smaller object, such as the location 320 of the first touch as shown in FIG. 3A. As a particular example, at time 440, a finger may be placed on the touch sensor device. As shown in FIG. 4A, the signal level increases and may be detected as a finger touch of the touch sensor device. In this manner, differential pairs of receiver electrodes, and differential transmitter electrodes, as described with reference to FIG. 3A-3D, may detect both a large object and a small object while mitigating noise.

FIG. 4B illustrates a waveform 450 of differential receiver electrode signals across a touch sensor device for a small object such as a finger touch. The y-axis (vertical axis) indicates the signal strength level of the differential signal measured between each receiver pair. The x-axis (horizontal axis) identifies a particular differential receiver (Rx) pair by number. For example, with reference to FIG. 3A, receiver electrodes 308, 309 may form differential pair (DP) DP0, receiver electrodes 310, 311 may form DP1, and so forth. The example illustrated shows signal strength over 13 differential receiver pairs, with each pair having a positive receiver electrode and a negative receiver electrode. Of course, in accordance with the previous description, any suitable number of receiver pairs may be used.

As shown, at location 460, for DP1 (e.g., corresponding to receiver electrodes 310, 311) and DP2 (e.g., corresponding to receiver electrodes 312, 313), the processing system 110 may read relatively low levels of a resulting differential signal indicating no object is in contact with the touch sensor device in the regions near DP1 and DP2. For example, the signal strength as shown at DP1 and DP2 may not exceed a threshold 490.

At location 470, for DP3 (e.g., corresponding to receiver electrodes 314, 315) and DP4 (e.g., corresponding to receiver electrodes 316, 317), the processing system 110 may read relatively high levels of a resulting differential signal, e.g., sensing signals that exceed the threshold 490. The high levels of differential signal indicate that an object is in contact with or proximate to the touch sensor device in the regions near receiver DP3 and DP4.

At location 480, for receiver pairs DP5 through DP12, the processing system 110 may again read low levels of resulting differential signal, e.g., differential signals below the threshold 490. The low levels of differential signals indicate that no object is in contact with the touch sensor device in the regions near DP5 through DP12.

Figure 5A:
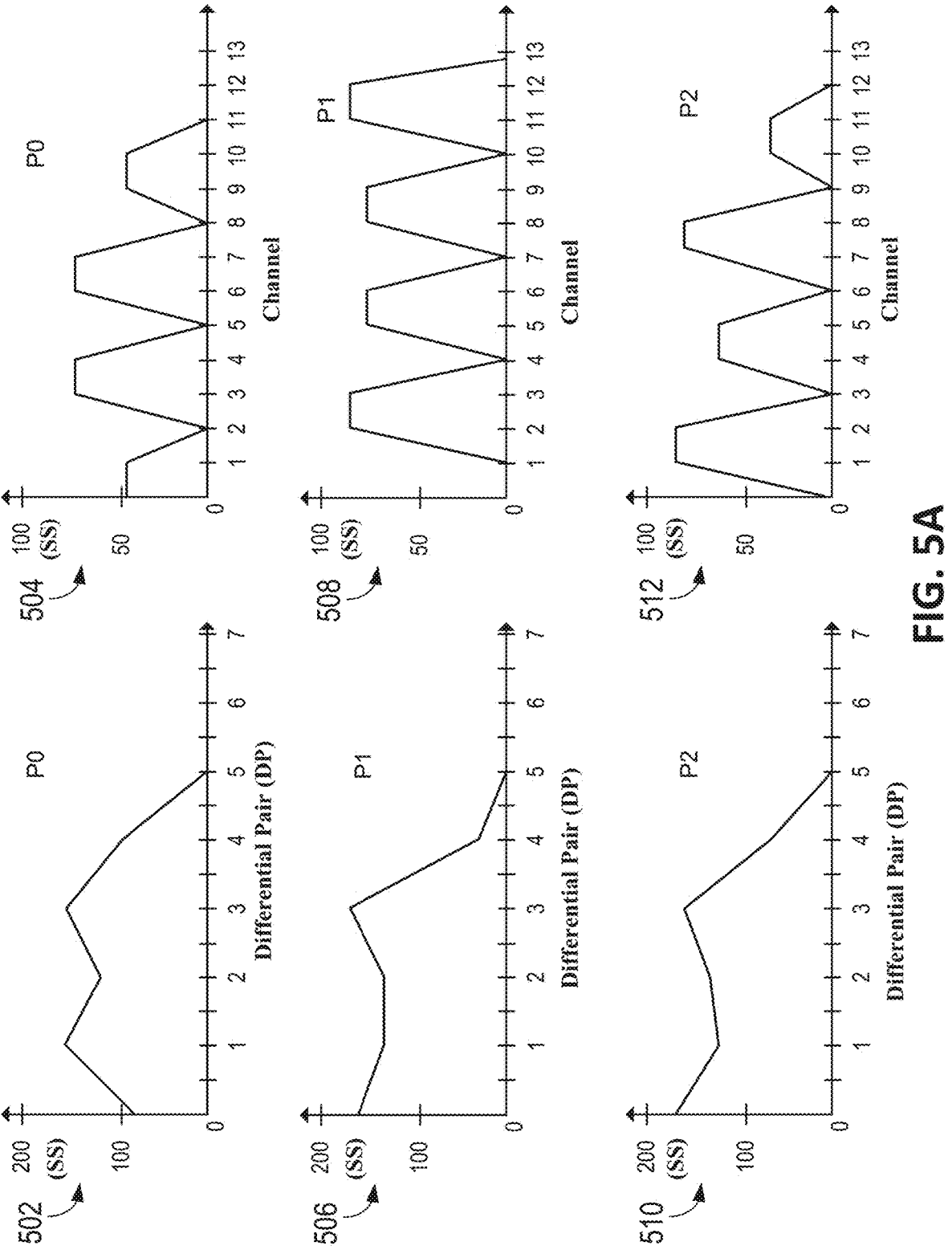
FIG. 5A illustrates waveforms of differential resulting signals from receiver electrode pairs configured for sequential differential parallel touch sensing for different patterns, according to one or more embodiments.

FIG. 5A illustrates an example of signal strength as determined from resulting signals across various differential receiver pairs during sequential differential capacitive sensing. In each of graphs 502, 506 and 510, the graphs illustrate examples of relative strength (ss) (y-axis) for differential receiver pairs (DP) (x-axis). DP0 on the x-axis corresponds to signal strength value from a first differential pair, DP1 on the x-axis corresponds to a signal strength value from a second differential pair, etc. For example, with reference to FIG. 3D, graph 502 corresponds to the pattern P0 at time T0. DP0 on the x-axis in graph 502 corresponds to receiver electrodes 301 and 308, and the corresponding value on the y-axis is the relative signal strength of the differential resulting signal from the receiver electrodes 301 and 308. Similarly, graph 506 corresponds to the pattern P1 at time T1. DP0 in graph 506 corresponds to receiver electrodes 302 and 309, and the corresponding value on the y-axis is the relative signal strength of the differential resulting signal from the receiver electrodes 302 and 309. Graph 510 corresponds to the pattern P2 and time T2. DP0 in graph 510 corresponds to receiver electrodes 308 and 309, and the corresponding value on the y-axis is the relative signal strength of the differential resulting signal from the receiver electrodes 308 and 309.

Graphs 504, 508, and 512 show examples of graphs 502, 506 and 510, respectively, expanded to a full set of channels for the touch sensor. The full channel graphs 504, 508, and 512 extrapolate the data from graphs 502, 506 and 510 such that values are proved for all electrodes, i.e., positive and negative receiver electrodes and positive and negative transmitter electrodes. To achieve full channel data, half of the relative strength measured value across a differential pair of receiver electrodes is assigned to each of the positive and negative receiver electrode in the differential pair. Transmitter electrodes are assigned a value of zero. The graphs 504, 508 and 512 show data for the 13 channels of the touch sensor, e.g., 13 of the 18 channels shown in FIG. 3D.

As a specific example, graph 504 is a full channel expansion of graph 502. Channels 0 and 1 on the x-axis in graph 504 correspond to DP0, i.e., receiver electrodes 301 and 308 as shown in pattern P0 at time T0 in FIG. 3D. The values are about half of those shown for DP0 in graph 502. Channel 2 in graph 504 is assigned a value of 0 since that corresponds to transmitter electrode 309 in pattern P0 at time T0 as shown in FIG. 3D.

It will be appreciated that the three graphs 504, 508, and 512 collectively provide relative signal strength for all channels by using sequential differential parallel touch sensing as shown and described in connection with FIG. 3D.

Figure 5B:
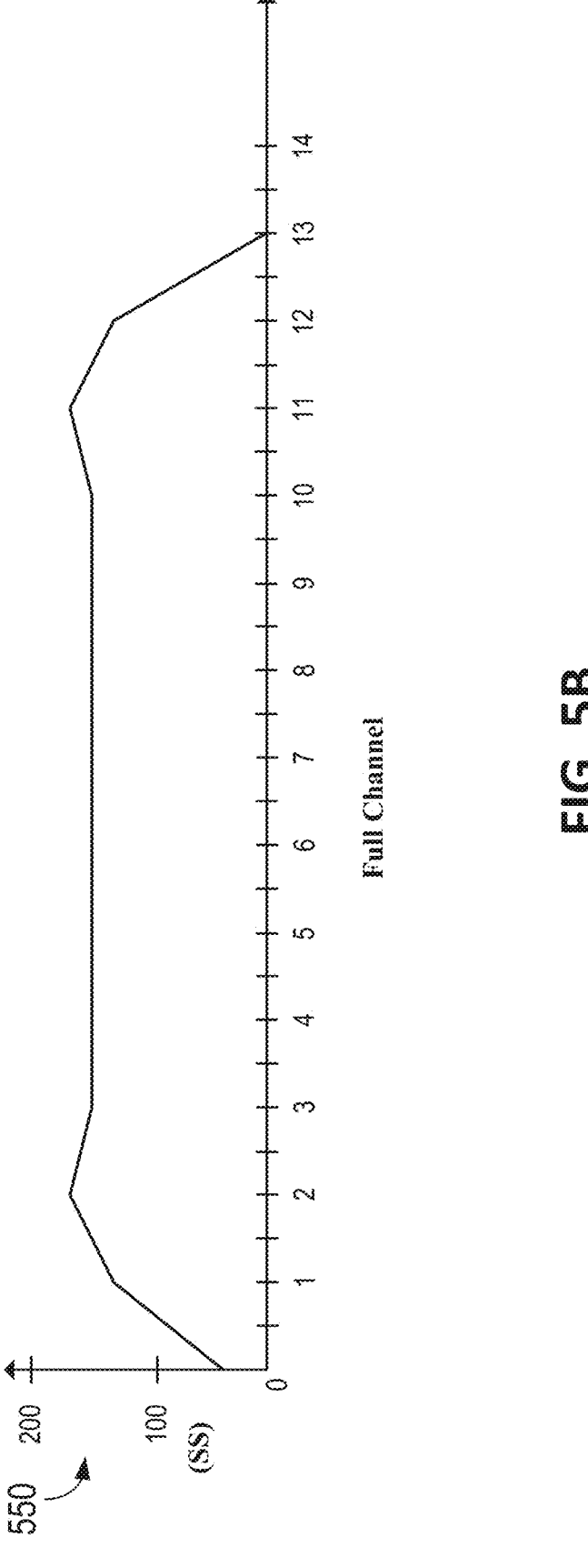
FIG. 5B illustrates an aggregated waveform of differential resulting signals from receiver electrode pairs configured for sequential differential parallel touch sensing, according to one or more embodiments.

FIG. 5B shows an aggregation of the data 550 from graphs 504, 508 and 512. As can be seen, the aggregated data 550 shows a complete set of relative signal strength values across all channels thereby permitting full resolution across the touch sensor. Of course, it will be appreciated that data representing less than full resolution can be used where suitable for the application. For example, data from only one or two of graphs 504, 508, and 512 can be used. Using fewer patterns can typically be done in less time thereby providing more efficient sensing provided the decrease in resolution is suitable for the application.

Figure 6:
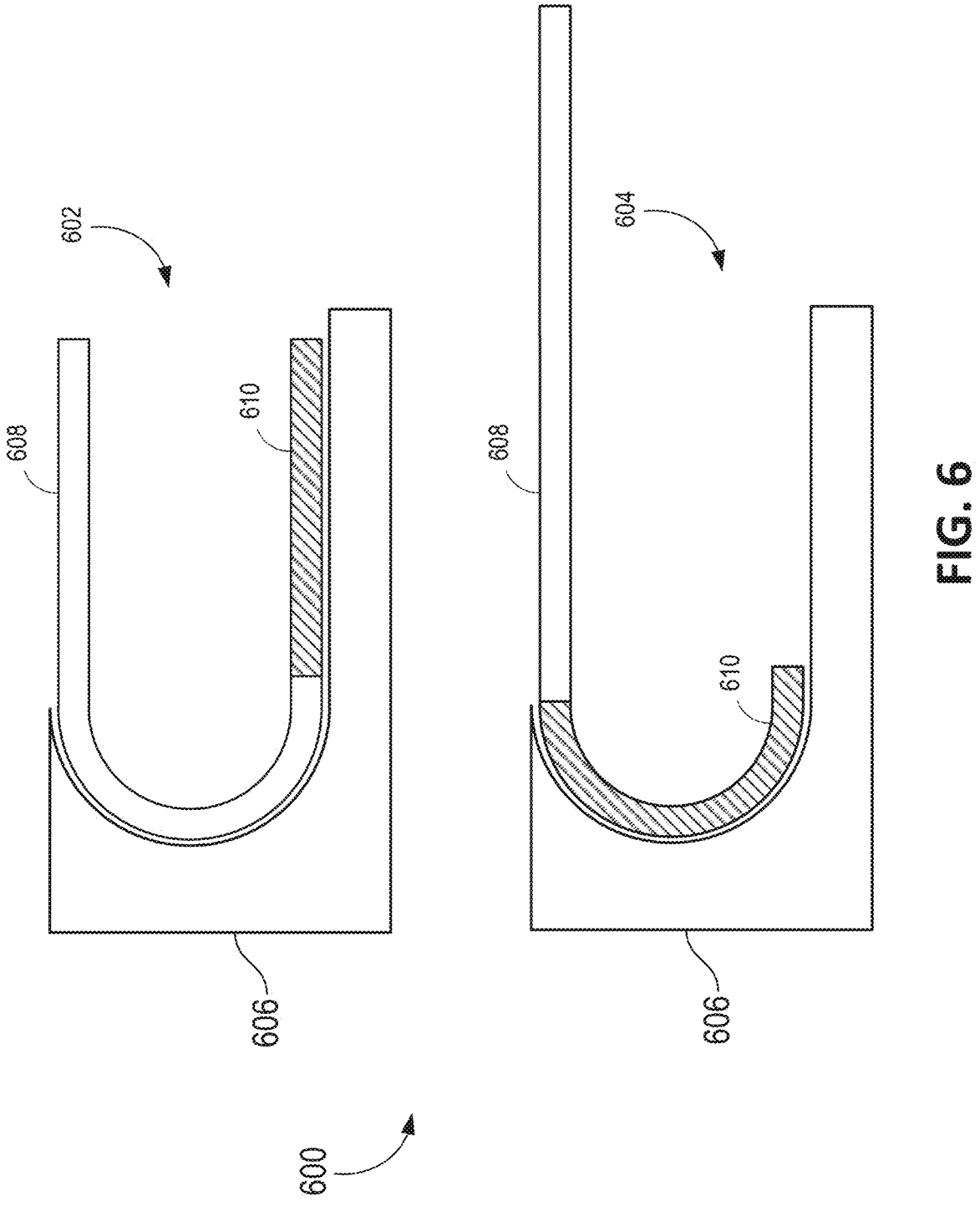
FIG. 6 illustrates an example of a rollable input device in a closed and opened state, according to one or more embodiments.

FIG. 6 illustrates an example of a rollable device 600, which is an example of the input device 100 (FIG. 1). The systems and methods described herein can be used to determine whether the rollable device 600 is open, partially open, or closed. An example of a rollable device 600 is rollable phone with a touch sensor having integrated display.

The rollable device 600 includes a body 606. The rollable device 600 also includes a touch sensor 608 and non-sensing portion 610 which are movable, e.g., rollable relative to the body 606. The touch sensor 608 may be integrated with a display as described in connection with FIG. 2. The rollable device 600 is shown in a fully opened state 604 where a maximum portion of the touch sensor 608, including display, is exposed and a fully closed state 602 where a minimum portion of the touch sensor 608, including display, are exposed. It will be understood that the rollable phone includes intermediate states where the rollable phone is partially closed and partially opened during which a part of the touch sensor and, if present, display are exposed.

The body 606 may be made of any suitable material such as plastic or metal or a combination of materials. The portions of the touch sensor 608 exposed to, for example, air will provide certain values of relative signal strength when subjected to differential parallel sensing as described herein. Other portions of the touch sensor 608, which are proximate to the body 606 in a closed or partially closed state, will provide different values of relative signal strength when subjected to the differential parallel sensing. Thus, by performing differential parallel sensing as shown in FIG. 3A-FIG. 3C or sequential differential parallel sensing as shown in FIG. 3D, the position of the touch sensor 608 relative to the overall input device (e.g., whether opened, closed, or some state in between) can be ascertained.

It will further be understood that, although described in the context of a rollable device, the systems and methods described herein can be used to detect whether a touch sensor is wholly or partially in contact with or proximate to different surfaces or materials. For example, the methods and systems can be used to detect whether a touch sensor, including where applicable a display, are placed in whole or in part in a pocket, protective sleeve and/or are immersed in whole or in part in a liquid such as water. Such uses are, of course, provided by way of example and not limitation. The input device may then execute an appropriate action depending on the results. For example, a display or part of display may be disabled or turned off, the input device may be locked and/or placed in a low power or doze mode and the like.

FIG. 7 illustrates data 700 that may be used to facilitate determining which portion of the touch sensor, and if applicable display, are in contact with or proximate to particular surfaces or materials e.g., air, body of rollable phone, metal, plastic, etc. such as described by way of example in connection with FIG. 6.

The data 700 includes rows that correspond to the amount of the touch sensor that is in contact with, or proximate, to a particular surface or material. For example, with respect to FIG. 6, each row represents an amount of the touch sensor 608 that is proximate to the body 606 as expressed, for example, in millimeters (mm). In the example, first row, labelled 1, corresponds to a fully closed device (e.g., rollable phone) and last row, labelled 38, corresponds to a fully opened device. The rows between the top row and bottom row represent intermediate states between being fully open and fully closed, which in the example correspond to mm of the touch sensor exposed to a medium such as air. The columns correspond to differential pairs for a given differential pair of receiver electrodes. For example, with reference to FIG. 3A, DP0 corresponds to receiver electrodes 308 and 309. DP1 corresponds to receiver electrodes 310 and 311 and so forth. It will be appreciated that data 700 is only shown for five receiver pairs. In practice, data 700 may be present for all differential receiver pairs in the touch sensor.

The values in the table correspond to approximate expected values for the differential pairs of receiver electrodes for a given state, e.g., determined with reference to which portions of the touch sensor may be exposed to one medium or surface (e.g., air) as compared to another medium or surface (e.g., water, plastic, metal, etc.). It will be understood that only exemplary values are shown.

By way of example, if the rollable device of FIG. 6 were fully closed (e.g., at 1 mm), as reflected by state 602, using the exemplary data 700 of FIG. 7, it would be anticipated that the value of differential resulting signals from DP0, DP1, DP2, DP3 and DP4 would be about 8, 62, 129, 130 and 76, respectively. Conversely, if the rollable device of FIG. 6 were fully open (e.g., at 38 mm), using the exemplary data 700 of FIG. 7, it would be anticipated that the value of differential resulting signals from DP0, DP1, DP2, D 3 and DP4 would be about 0, 0, 0, 0 and 0, respectively. As yet another example, if the rollable device of FIG. 6 were slightly closed by 1 mm (e.g., at 37 mm), it would be anticipated that the value of differential resulting signals from DP0, DP1, DP 2, DP 3 and DP 4 would be about −3, 10, 2, −5 and −5, respectively. The data 700 shown in FIG. 7 may be determined using any suitable means such as experimentation, or calculation using material properties and distance of material from sensor electrodes. Further, it will be understood that measured (read) resulting differential signals may not exactly match any row in data 700. In such cases, the processing system determines the closest match.

It will be understood that the data 700 of FIG. 7 corresponds to one pattern of differential parallel sensing. If, for example, sequential differential parallel sensing were employed, multiple sets of data may be supplied. For example, with reference to FIG. 3D, three sets of data may be used, e.g., one set of data for each of patterns P0, P1 and P2.

Figure 8:
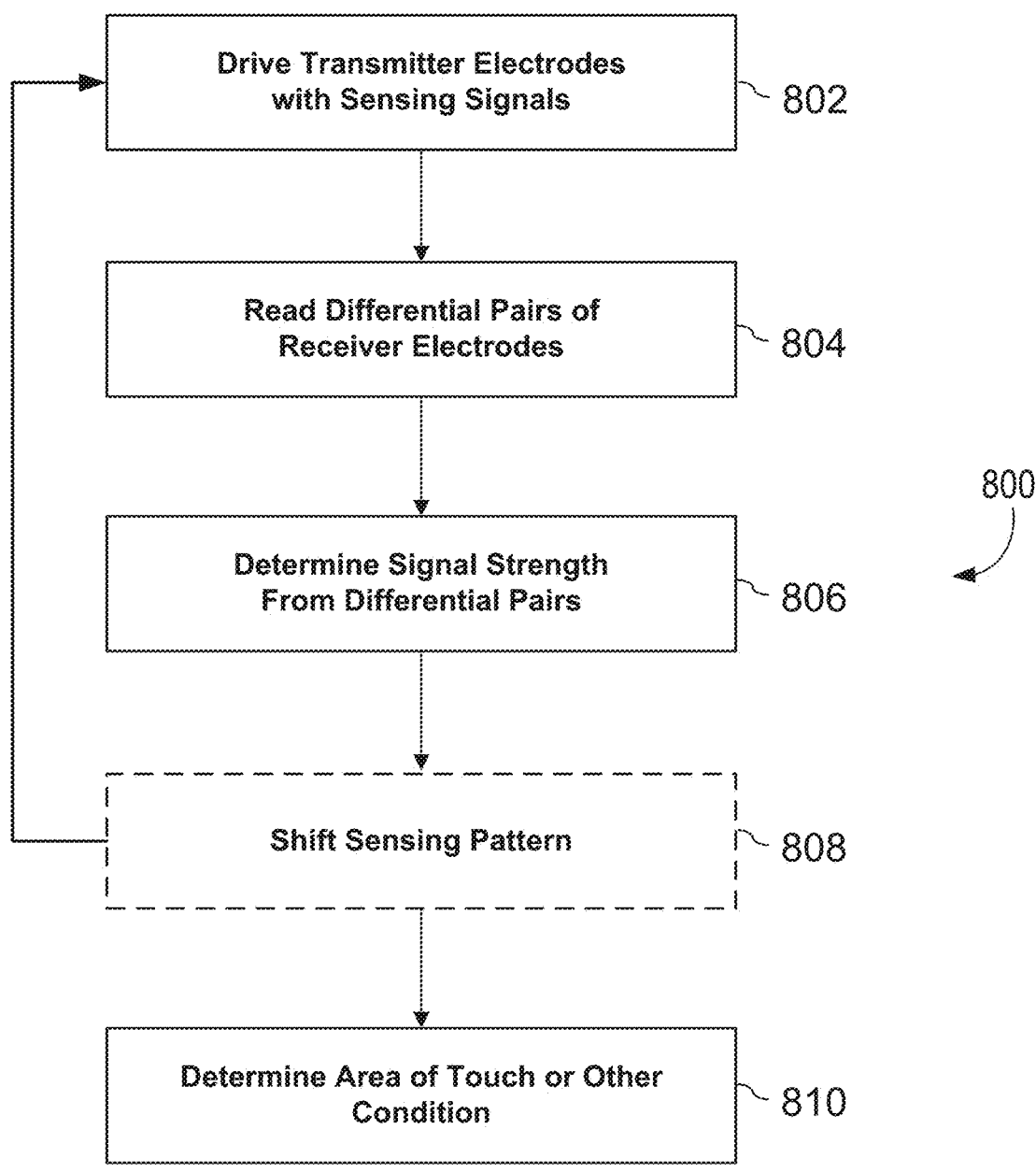
FIG. 8 illustrates a method for performing sensing using differential parallel touch sensing, according to one or more embodiments.

FIG. 8 illustrates a process or method 800 of operating a touch sensor in accordance with embodiments of differential parallel touch sensing described herein. It will be understood that the method 800 need not be performed in the order shown, and stages may be concurrently or simultaneously performed, except where otherwise apparent.

At stage 802, the processing system 110, e.g., sensor circuitry 104, drives the transmitter electrodes with sensing signals. For example, in connection with FIG. 3A-3D, the processing system 110 drives positive transmitter electrodes with a positive sensing signal and drives negative transmitter electrodes with an opposite polarity sensing signal according to a determined pattern. As previously described, the negative sensing signal may, for example, be the inverse or negative of the positive sensing signal.

At stage 804, the processing system 110 reads resulting signals from the differential pairs of receiver electrodes. The differential pairs may be read concurrently, sequentially or in some other order. Reading of the resulting signals may include application of noise mitigation techniques such as ADNS or the like.

At stage 806, the signal strength from each differential pair is determined. The signal strength may be determined by, for example, combining the signal read from the positive and negative receiver electrodes of each differential pair. As a specific example, a resulting signal of a negative receiver electrode may be subtracted from a resulting signal of an adjacent positive receiver electrode for each differential pair or vice versa. As previously described, subtracting a resulting signal from one of the differential pair from the other of the differential pair mitigates noise by removing (subtracting out) noise from resulting signals.

In certain embodiments, such as sequential differential parallel sensing, at stage 808, the touch sensing pattern may be adjusted, e.g., shifted. For example, as shown in FIG. 3D, the pattern may be shifted from one of pattern P0, P1, or P2 to another of pattern P0, P1 or P2. This step may be iteratively performed following stage 804 until the touch sensor electrodes are driven with all desired patterns. Stage 808 may be performed partially or entirely concurrently with stage 806.

Stage 808 may be performed for each pattern of touch sensing individually and results may be combined or aggregated as, for example, described in connection with FIG. 5A-FIG. 5B.

At stage 810, the processing system 110 determines if an object, surface or material is proximate to one or more areas of the touch sensor. For example, an object is determined to be proximate to the touch sensor in a particular area if the differential resulting signal from a differential pair at a respective location exceeds a threshold value. As described in connection with FIG. 6-FIG. 7, determining that an object is proximate to one or more areas of the touch may include determining whether a portion of the touch sensor is proximate to a surface or material. Such determination may include, for example, determining whether an input device, such as rollable phone, is open, closed, or partially closed; whether the input device has been placed in a pocket or protective sleeve, or whether the input device is immersed or partially immersed in a substance such as water or other liquid, as but a few examples.

The method 800 may be repeated over multiple capacitive frames, which may facilitate detection of an input object is in motion relative to the touch sensor.

The method and system herein may be used to more efficiently implement functions and features, such as, for instance, a doze mode. Doze mode is a low power state used, for example, to conserve power. Conventional techniques may require two bursts of sensing signal to detect a touch to wake up from a doze mode. As reflected in the method and system described in connection with FIG. 3-FIG. 6, the embodiments herein can detect a touch with a single burst, which detected touch may be used to wake up the electronic device from a low power mode. Further power savings can be achieved with the system and method, which as previously described may be implemented using only a subset of the total number electrodes making up the touch sensor.

The method and system can also be used to execute functionality depending on the state of an input device. For example, if a rollable phone is partially closed, only the visible part of a display may be active. Similarly, if an input device is in a pocket or protective sleeve, the device may be placed into a low power mode.

In view of the foregoing, it will be appreciated that exemplary embodiments of the present disclosure minimize the effects of noise, while at the same time provide accurate detection of input objects of various sizes and may be implemented in a manner that minimizes power consumption.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A touch sensor having a sensing area, comprising:
a plurality of sets of sensor electrodes, each set of sensor electrodes comprising:
a positive transmitter electrode;
a negative transmitter electrode;
a differential pair of receiver electrodes comprising:
a positive receiver electrode coupled to the positive transmitter electrode;
a negative receiver electrode coupled to the negative transmitter electrode, wherein the differential pair of receiver electrodes is disposed between the positive transmitter electrode and the negative transmitter electrode;
a sensor circuit configured to:
drive the positive transmitter electrode with a positive sensing signal;
drive the negative transmitter electrode with a negative sensing signal;
receive resulting signals from the differential pair of receiver electrodes; and
process the resulting signals.

2. The touch sensor according to claim 1, wherein the negative sensing signal is an inverse of the positive sensing signal.

3. The touch sensor according to claim 1, wherein:
the positive transmitter electrode comprises a plurality of adjacent positive transmitter electrodes; and/or
the negative transmitter electrode comprises a plurality of adjacent negative transmitter electrodes.

4. The touch sensor according to claim 1, wherein:
the resulting signals comprise a first resulting signal from the positive receiver electrode and a second resulting signal from the negative receiver electrode; and
the sensor circuit is further configured to process the resulting signals by subtracting the second resulting signal from the first resulting signal.

5. The touch sensor according to claim 1, wherein the plurality of sets of sensor electrodes are configured to operate in a transcapacitive sensing mode.

6. The touch sensor according to claim 1, wherein each set of sensor electrodes is shifted such that:
the positive transmitter electrode becomes a positive receiver electrode;
the negative transmitter electrode becomes a negative receiver electrode;
the negative receiver electrode becomes a positive receiver electrode or a negative transmitter electrode; and
the positive receiver electrode becomes a negative receiver electrode or a positive transmitter electrode.

7. The touch sensor according to claim 1, wherein the sensor circuit is further configured to determine that a first portion of the touch sensor is proximate to a first material and that a second portion of the touch sensor is proximate to a second material.

8. An input device comprising:
a display;
a touch sensor integrated with the display and having a sensing area, comprising:
a plurality of sets of sensor electrodes, each set of sensor electrodes comprising:
a positive transmitter electrode;
a negative transmitter electrode;
a differential pair of receiver electrodes comprising:
a positive receiver electrode coupled to the positive transmitter electrode;
a negative receiver electrode coupled to the negative transmitter electrode, wherein the differential pair of receiver electrodes is disposed between the positive transmitter electrode and the negative transmitter electrode;
a sensor circuit configured to:
drive the positive transmitter electrode with a positive sensing signal;
drive the negative transmitter electrode with a negative sensing signal;
receive resulting signals from the differential pair of receiver electrodes; and
process the resulting signals.

9. The input device according to claim 8, wherein the negative sensing signal is an inverse of the positive sensing signal.

10. The input device according to claim 8, wherein:
the positive transmitter electrode comprises a plurality of adjacent positive transmitter electrodes; and/or
the negative transmitter electrode comprises a plurality of adjacent negative transmitter electrodes.

11. The input device according to claim 8, wherein:
the resulting signals comprise a first resulting signal from the positive receiver electrode and a second resulting signal from the negative receiver electrode; and
the sensor circuit is further configured to process the resulting signals by subtracting the second resulting signal from the first resulting signal.

12. The input device according to claim 8, wherein the plurality of sets of sensor electrodes are configured to operate in a transcapacitive sensing mode.

13. The input device according to claim 8, wherein each set of sensor electrodes is shifted such that:
the positive transmitter electrode becomes a positive receiver electrode;
the negative transmitter electrode becomes a negative receiver electrode;
the negative receiver electrode becomes a positive receiver electrode or a negative transmitter electrode; and
the positive receiver electrode becomes a negative receiver electrode or a positive transmitter electrode.

14. The input device according to claim 8, wherein the sensor circuit is further configured to determine that a first portion of the touch sensor is proximate to a first material and that a second portion of the touch sensor is proximate to a second material.

15. A method for capacitive sensing with a touch sensor, comprising:
driving a plurality of positive transmitter electrodes with a positive sensing signal;

driving a plurality of negative transmitter electrodes with a negative sensing signal;

receiving first resulting signals from a plurality of positive receiver electrodes;

receiving second resulting signals from a plurality of negative receiver electrodes; and processing the first resulting signals and the second resulting signals, wherein the plurality of positive receiver electrodes and the plurality of negative receiver electrodes form differential pairs, each differential pair comprising a positive receiver electrode of the plurality of positive receiver electrodes and a negative receiver electrode of the plurality of negative receiver electrodes, and wherein the positive receiver electrode is coupled to a positive transmitter electrode of the plurality of positive transmitter electrodes and the negative receiver electrode coupled to a negative transmitter electrode of the plurality of negative receiver electrodes.

16. The method according to claim 15, wherein the negative sensing signal is an inverse of the positive sensing signal.

17. The method according to claim 15, wherein:

the positive transmitter electrode comprises a plurality of adjacent positive transmitter electrodes; and/or the negative transmitter electrode comprises a plurality of adjacent negative transmitter electrodes.

18. The method according to claim 15, wherein processing the first resulting signals and the second resulting signals comprises:

subtracting the second resulting signal from the first resulting signal.

19. The method according to claim 15, further comprising:

shifting sensor electrodes such that:

the positive transmitter electrode becomes a positive receiver electrode;

the negative transmitter electrode becomes a negative receiver electrode;

the negative receiver electrode becomes a positive receiver electrode or a negative transmitter electrode; and the positive receiver electrode becomes a negative receiver electrode or a positive transmitter electrode.

20. The method according to claim 15, further comprising:

determining that a first portion of the touch sensor is proximate to a first material and that a second portion of the touch sensor is proximate to a second material.

* * * * *